United States Patent
Kurita

(10) Patent No.: US 9,378,032 B2
(45) Date of Patent: Jun. 28, 2016

(54) INFORMATION PROCESSING METHOD, INFORMATION PROCESSING APPARATUS, RECORDING MEDIUM, AND SYSTEM

(71) Applicant: FUJITSU LIMITED, Kawasaki-shi, Kanagawa (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 13/957,162

(22) Filed: Aug. 1, 2013

(65) Prior Publication Data

US 2014/0082616 A1   Mar. 20, 2014

(30) Foreign Application Priority Data

Sep. 20, 2012   (JP) .................................. 2012-207640

(51) Int. Cl.
*G06F 9/455* (2006.01)
*H04L 12/26* (2006.01)
*H04L 12/931* (2013.01)

(52) U.S. Cl.
CPC ............ *G06F 9/455* (2013.01); *G06F 9/45558* (2013.01); *H04L 43/0888* (2013.01); *H04L 49/70* (2013.01); *G06F 2009/4557* (2013.01); *H04L 43/0894* (2013.01)

(58) Field of Classification Search
CPC ...................................................... G06F 9/455
USPC ............................................................ 718/1
See application file for complete search history.

(56) References Cited

U.S. PATENT DOCUMENTS

| 2005/0071504 A1 | 3/2005 | Handlogten et al. |
| 2005/0268298 A1 | 12/2005 | Hunt et al. |
| 2009/0144393 A1* | 6/2009 | Kudo ............................ 709/218 |
| 2010/0115049 A1 | 5/2010 | Matsunaga et al. |
| 2014/0032642 A1* | 1/2014 | Karthikeyan et al. ......... 709/203 |

FOREIGN PATENT DOCUMENTS

| JP | 2005-327279 A | 11/2005 |
| JP | 2007-507938 A | 3/2007 |
| JP | 2010-108409 A | 5/2010 |
| JP | 2011-203810 A | 10/2011 |
| WO | WO 2005/032025 A1 | 4/2005 |

OTHER PUBLICATIONS

Japanese Office Action of Japanese Patent Application No. 2012-207640 dated Dec. 15, 2015, with Partial Translation.

* cited by examiner

*Primary Examiner* — Emerson Puente
*Assistant Examiner* — Charlie Sun
(74) *Attorney, Agent, or Firm* — Arent Fox LLP

(57) ABSTRACT

An information processing method including calculating, for migration of a first virtual machine between a migration-source computer coupled to a network and a migration-destination computer coupled to the network, a difference between a first resource allocated to the first virtual machine in the migration-source computer and a second resource to be allocated to a second virtual machine to be executed based on the virtual machine in the migration-destination computer, estimating a bandwidth for the network to be used by the second virtual machine based on the difference and a bandwidth for the network used by the first virtual machine in the migration-source computer.

18 Claims, 19 Drawing Sheets

FIG. 6

| VM ID | BANDWIDTH | ACTUALLY MEASURED (M) / CORRECTED (E) | VIRTUAL-MACHINE CPU SPEED | VIRTUAL-MACHINE NIC SPEED |
|---|---|---|---|---|
| 1 | 200Mbps | M | 2GHz | 1Gbps |

FIG. 7

| VIRTUAL-MACHINE CPU SPEED | VIRTUAL-MACHINE NIC SPEED |
|---|---|
| 3GHz | 1Gbps |

FIG. 8

| VM ID | BANDWIDTH | ACTUALLY MEASURED (M) / CORRECTED (E) | VIRTUAL-MACHINE CPU SPEED | VIRTUAL-MACHINE NIC SPEED |
|---|---|---|---|---|
| 1 | 300Mbps | E | 3GHz | 1Gbps |

FIG. 9

| VM ID | BANDWIDTH | ACTUALLY MEASURED (M) / CORRECTED (E) | VIRTUAL-MACHINE CPU SPEED | VIRTUAL-MACHINE NIC SPEED |
|---|---|---|---|---|
| 1 | 295Mbps | M | 3GHz | 1Gbps | ary and explanatory and are not restrictive of the invention,
INFORMATION PROCESSING METHOD, INFORMATION PROCESSING APPARATUS, RECORDING MEDIUM, AND SYSTEM

CROSS-REFERENCE TO RELATED APPLICATION

This application is based upon and claims the benefit of priority of the prior Japanese Patent Application No. 2012-207640 filed on Sep. 20, 2012, the entire contents of which are incorporated herein by reference.

FIELD

The embodiments discussed herein are related to an information processing method, an information processing apparatus, a recording medium, and a system.

BACKGROUND

In virtualization technology for executing a virtual machine in a server, technology called "migration" for migrating a virtual machine to another server is available. For migration of a virtual machine, setting information regarding an execution state of the virtual machine to be migrated is transferred to a server to which the virtual machine is to be migrated.

FIG. 1 illustrates an information processing system according to related art. The information processing system includes servers (which may be represented as SVs) 10 and 20 and a network 40. The server 10 includes virtual machines (VMs) 11 and 12 and a virtual switch (vSW) 13. The server 20 includes a virtual machine 21 and a virtual switch 22.

For example, the virtual machine 11 transmits data to the network 40 via the virtual switch 13 and the virtual machine 21 receives the transmitted data via the virtual switch 22. The virtual switch 13 arbitrates data transmission by the virtual machine 11 and data transmission by the virtual machine 12.

For example, when the virtual machine 12 is migrated from the server 10 to the server 20, setting information regarding the execution state of the virtual machine 12 is transmitted to the server 20. When the migration of the virtual machine 12 is completed, the migrated virtual machine 12 is executed in the server 20 in conjunction with the virtual machine 21 already executed in the server 20.

Meanwhile, there is a technology for selecting one pipe flow from multiple pipe flows on the basis of Quality of Service parameters. There is also a technology for generating, when a physical network interface card (hereinafter referred to as a "NIC") in one server is changed to a physical NIC having higher performance, pseudo congestion so that a reception buffer in an application executed in the server does not overflow.

Examples of the related art are disclosed in International Publication Pamphlet No. WO 2005/032025 and Japanese Laid-open Patent Publication No. 2011-203810.

SUMMARY

According to an aspect of the invention, an information processing method including calculating, for migration of a first virtual machine between a migration-source computer coupled to a network and a migration-destination computer coupled to the network, a difference between a first resource allocated to the first virtual machine in the migration-source computer and a second resource to be allocated to a second virtual machine to be executed based on the virtual machine in the migration-destination computer, estimating a bandwidth for the network to be used by the second virtual machine based on the difference and a bandwidth for the network used by the first virtual machine in the migration-source computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a bandwidth profile in the information processing system according to the embodiment;

FIG. 7 illustrates an example of a virtual machine profile in the information processing system according to the embodiment;

FIG. 8 illustrates another example of the bandwidth profile in the information processing system according to the embodiment;

FIG. 9 illustrates another example of the bandwidth profile in the information processing system according to the embodiment;

DESCRIPTION OF EMBODIMENT

First, a description will be given of the inventor's consideration on the related art. After migration of a virtual machine, in order to execute control for causing the operation of the virtual machine to be migrated to cooperate with the operation of another virtual machine already executed in the migration-destination server before the migration, the bandwidth of the virtual machine to be migrated is measured to determine the level of the bandwidth.

In the migration-destination server in the migration, the virtual machine to be migrated and the other virtual machine executed before the migration share physical resources. The physical resources to be allocated after the migration may be varied, in an allowable range, from the physical resources allocated before the migration, depending on the usage situation of the resources in the migration-destination server, and in such cases, the bandwidth varies depending on the variation. The data transmitted by the virtual machine per unit time depends on the frequency of processing to be performed on the virtual machine.

A certain amount of measurement time is taken in order to ensure the accuracy of measuring the bandwidth of the virtual machine, and consequently, the control for causing the virtual machine to cooperate with the operation of the other virtual machine is waited for in the measurement period.

According to an embodiment described below, after the migration of a virtual machine, an operation for causing the migrated virtual machine and another virtual machine already executed in the migration-destination server in the migration to cooperate with each other is executed immediately.

Figure 1:
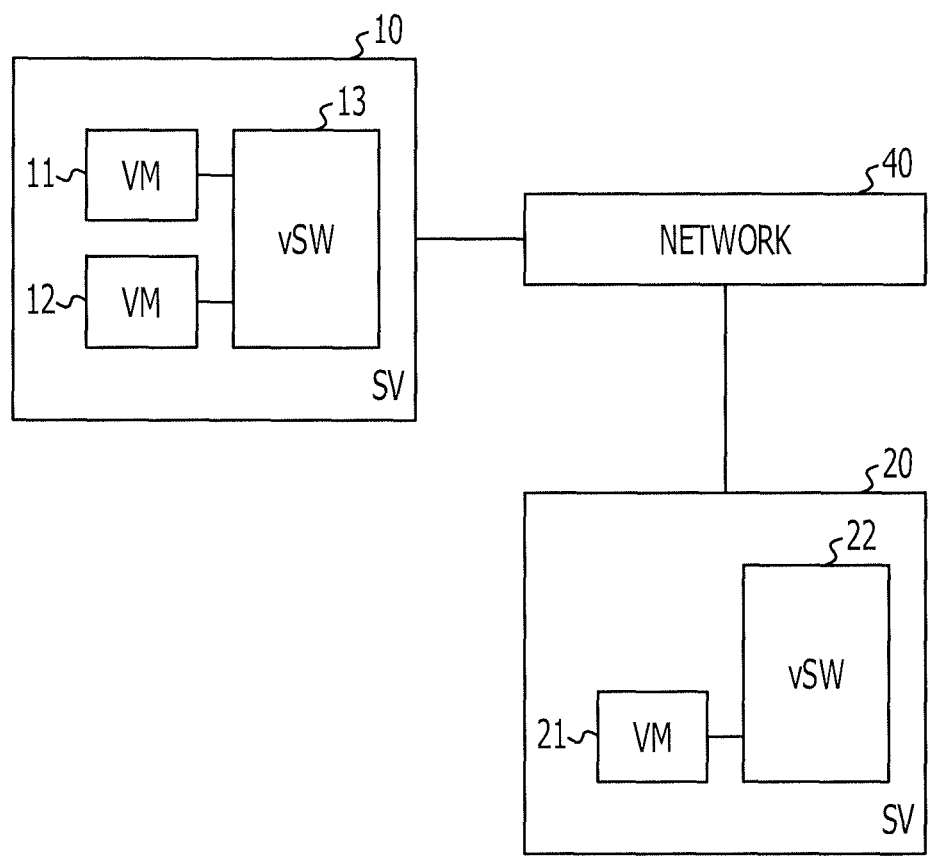
FIG. 1 illustrates an information processing system according to related art.
Figure 2:
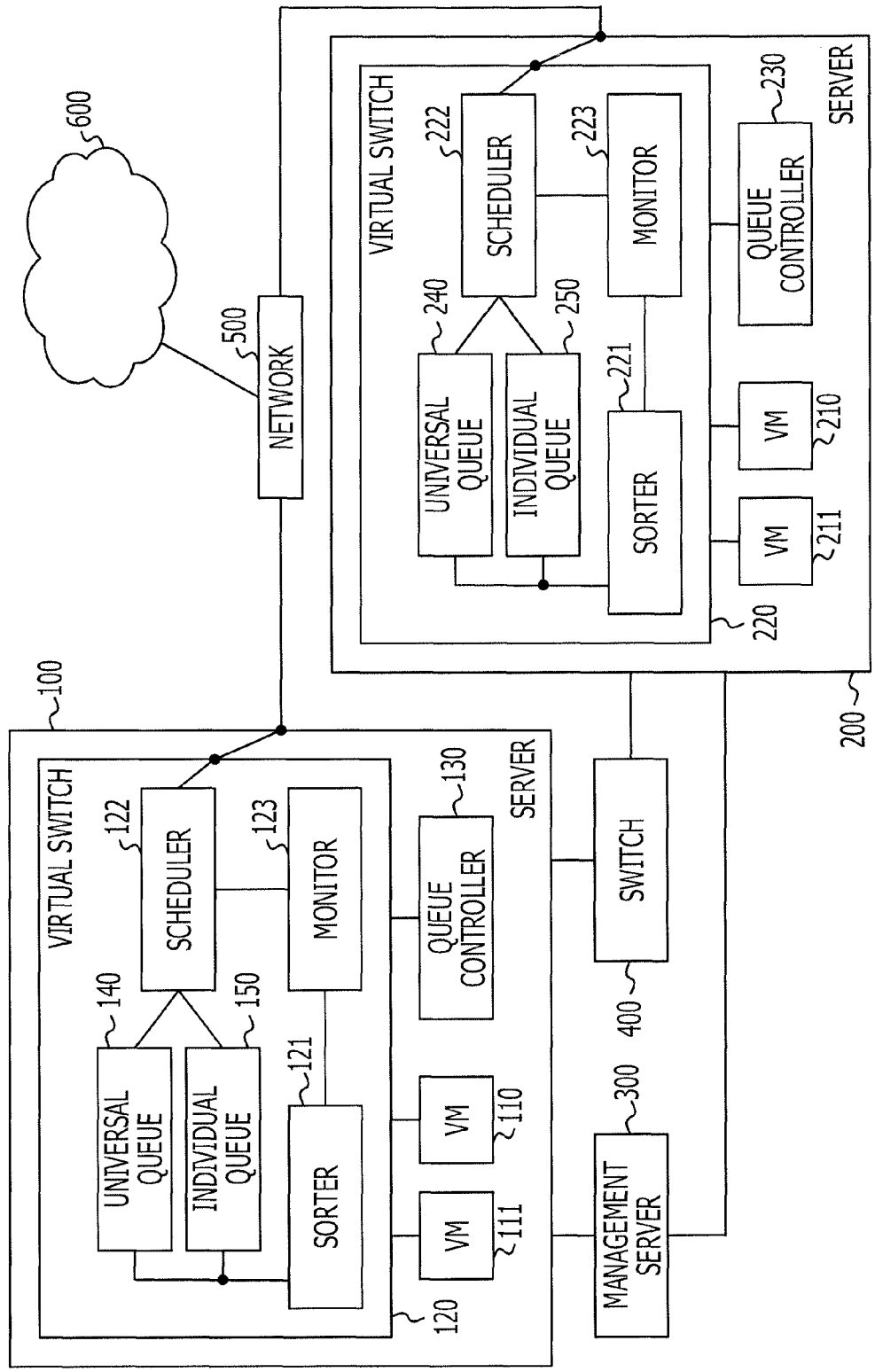
FIG. 2 illustrates an information processing system according to an embodiment.

FIG. 2 illustrates an information processing system according to the embodiment. The information processing system includes servers 100 and 200, a management server 300, a switch 400, and a network 500.

The server 100 has a processor, which executes a program stored in a memory to thereby execute virtual machines 110 and 111, a queue controller 130, and a virtual switch 120, which includes a sorter 121, a scheduler 122, a monitor 123, a universal queue 140, and an individual queue 150. In FIG. 2, each of the virtual machines 110 and 111 is represented as a "VM".

The virtual machines 110 and 111 are software or frameworks for emulating operation of a computer. The virtual switch 120 arbitrates data sent from the virtual machines 110 and 111 and sends the arbitrated data to a network interface card (NIC) in the server 100. The data sent to the NIC is transmitted to the server 200 through the network 500.

In accordance with an instruction issued by the queue controller 130, the sorter 121 sorts data, sent from the virtual machines 110 and 111 executed in the server 100, into either the universal queue 140 or the individual queue 150. The data sent from the virtual machines 110 and 111 may be classified according to a unit referred to as a "flow", for example, on the basis of the request source of the data or of whether or not the data is data for management. The sorter 121 may identify a flow on the basis of identification information contained in a packet sent by the virtual machines 110 and 111. For example, the sorter 121 identifies a flow on the basis of a combination of a media access control (MAC) address of a source virtual machine, the MAC address being contained in the packet, and a MAC address of a destination virtual machine, the MAC address being contained in the packet. For example, the sorter 121 identifies a flow on the basis of a flag indicating the type of data. Using those identification methods, the sorter 121 may identify multiple flows sent from one virtual machine. Either the universal queue 140 or the individual queue 150 may be selected for each of the flows, so as to allow the sorter 121 to sort data sent from the virtual machines 110 and 111.

The universal queue 140 is a queue for storing data from the virtual machines 110 and 111 or data in multiple flows. Data is read from the universal queue 140 in an order in which the data was stored in the universal queue 140.

The individual queue 150 is a queue for storing data from a specific virtual machine or data in a specific flow.

The term "queue" as used herein refers to a storage area for temporarily storing, when data is to be transmitted to outside of the server 100, the data in order for the scheduler 122 to arbitrate the order of transmitting the data. Each of the universal queue 140 and the individual queue 150 is realized by allocating a storage area to a register, a memory, or a first-in first-out (FIFO) buffer. For example, multiple storage areas may be prepared in a register, a memory, or a FIFO buffer so that any of the storage areas is allocated as the universal queue 140 and the individual queue 150 in accordance with an instruction from the queue controller 130 (described below).

The scheduler 122 sequentially selects one of the universal queue 140 and the individual queue 150 in accordance with a predetermined regulation to arbitrate data stored in the universal queue 140 or the individual queue 150 and transfers the arbitrated data to the NIC included in the server 100. For example, through sequentially selecting the above-described storage areas and reading data therefrom or through sequentially specifying addresses associated with the storage areas and reading data therefrom, the scheduler 122 arbitrates the data and transfers the arbitrated data to the NIC in the server 100.

The predetermined regulation may be that the individual queue 150 is selected in accordance with a predetermined rate based on a bandwidth of an external link connected to the server 100. For example, the arrangement may be such that, when the bandwidth of a flow of interest is larger than a value obtained by dividing the bandwidth of the external link connected to the server 100 by the number of flows in the server 100, the flow of interest is allocated to the individual queue 150 and the scheduler 122 selects the individual queue 150 at a rate at which the bandwidth of the flow is ensured. Other flows whose actually measured bandwidths are smaller may be allocated so that they are gathered in the universal queue 140.

For example, it is assumed that the bandwidth of the external link connected to the server 100 is 10 Gbps. It is assumed that the number of flows transmitted from the server 100 is 20 and the bandwidth of one of the flows is 1 Gbps. It is also assumed that the total of the bandwidths of the other flows is 9 Gbps or smaller. In this case, for example, the queue controller 130 allocates the flow having the bandwidth of 1 Gbps to the individual queue 150 and allocates the other flows to the universal queue 140. The scheduler 122 selects the individual queue 150 at a rate of at least once every 10 times. As a result of such queue allocation, a situation in which the transmission periods of multiple flows become unbalanced by the flow having the bandwidth of 1 Gbps when all of the flows are allocated to the universal queue 140 does not occur. Thus, fairness between the flows is ensured. In addition, since the individual queue 150 is selected at a rate as described above, communication of the flow having the bandwidth of 1 Gbps can be performed with the bandwidth being ensured.

The present embodiment is not limited to an example in which each of the universal queue 140 and the individual queue 150 is independently executed in the server 100. The queue selection executed by the scheduler 122 is processing (described below) executed using a processor, a memory controller, a memory, and so on in the server 100. That is, as the number of queues increases, the rate at which the scheduler 122 uses the processor, the memory controller, and the memory increases and thus the influence that the processing load of the scheduler 122 has on the server 100 increases. In this case, since the processing load of the scheduler 122 becomes a bottleneck, there are cases in which the bandwidth of the external link of the server 100 is not efficiently used. Accordingly, it is preferable that the number of queues be set on the basis of the number of flows and the bandwidth of each flow. In addition, the rate at which the scheduler 122 selects the queue is changed for each of the universal queue 140 and the individual queue 150 and the rate at which the data is transmitted to outside of the server 100 may be adjusted as appropriate.

The monitor 123 monitors the flows provided by the virtual machines 110 and 111 to measure the amount of data of each flow. During input to the sorter 121, output from the sorter 121, input to the scheduler 122, output from the scheduler 122, or the like, the monitor 123 identifies each flow on the basis of the aforementioned identification information of a packet and measures the amount of data in each flow.

The queue controller 130 calculates the bandwidth of each of the flows transmitted from the virtual machines 110 and 111 by dividing the amount of data measured by the monitor 123 by the time taken for the measurement. The amount of data transmitted to outside of the server 100 per unit time is represented by the bandwidth determined by the queue controller 130. On the basis of the bandwidth of each flow, the queue controller 130 determines to which of the universal queue 140 and the individual queue 150 each flow is to be allocated. The queue controller 130 then issues, to the virtual switch 120, an instruction regarding a regulation for allocating a queue to each flow.

Virtual machines executed in the server 100 are not limited to the virtual machines 110 and 111 and the number of virtual machines may be changed in accordance with resources, such as a processor and a memory, in the server 100. Elements included in the server 200 are substantially the same as the above-described elements included in the server 100, and thus descriptions thereof are omitted hereinafter. The configuration illustrated in FIG. 2 is merely exemplary, and thus the present embodiment is not limited to the number of servers, the number of virtual machines, the number of universal queues, the number of individual queues, and so on illustrated in FIG. 2.

The management server 300 is connected to the servers 100 and 200. The management server 300 transmits data for management to the servers 100 and 200, to thereby execute and control the deployment, migration, deletion, or the like of the virtual machines in the servers 100 and 200.

The servers 100 and 200 to which a command for migrating the virtual machine is issued by the management server 300 communicate setting information of the virtual machine to be migrated. In this case, in order to communicate the setting information of the virtual machine, the servers 100 and 200 may be connected to the switch 400 so as to communicate the setting information of the virtual machine via the switch 400. The setting information of the virtual machine may also be communicated via the management server 300.

A case in which a virtual machine 211 is migrated from the server 200 to the server 100 will now be described by way of example. In this case, setting information regarding an execution state of the virtual machine 211 is transmitted from the server 200 to the server 100 via the management server 300 or the switch 400. Processing based on the setting information is executed in the server 100, so that the virtual machine 211 is executed in the server 100. In the present embodiment, during migration, a bandwidth profile in which the bandwidth of the virtual machine 211 and the physical resources allocated to the virtual machine are 211 associated with each other is transmitted from the server 200, which is a migration-source server, to the server 100, which is a migration-destination server, and when the physical resources allocated after the migration are varied from the physical resources allocated before the migration, the setting information after the variation is transmitted from the management server 300 to the server 100, which is the migration-destination server.

The network 500 is a local area network (LAN) or a wide area network (WAN) for communication between the servers 100 and 200. The network 500 may be a bridge or a router for relaying a communication between the servers 100 and 200. The servers 100 and 200 may be included in one data center or may be included in respective different data centers. The network 500 is connected to another network 600 and the servers 100 and 200 communicate with other servers connected to the other network 600. The other network 600 is a LAN or WAN.

Figure 3:
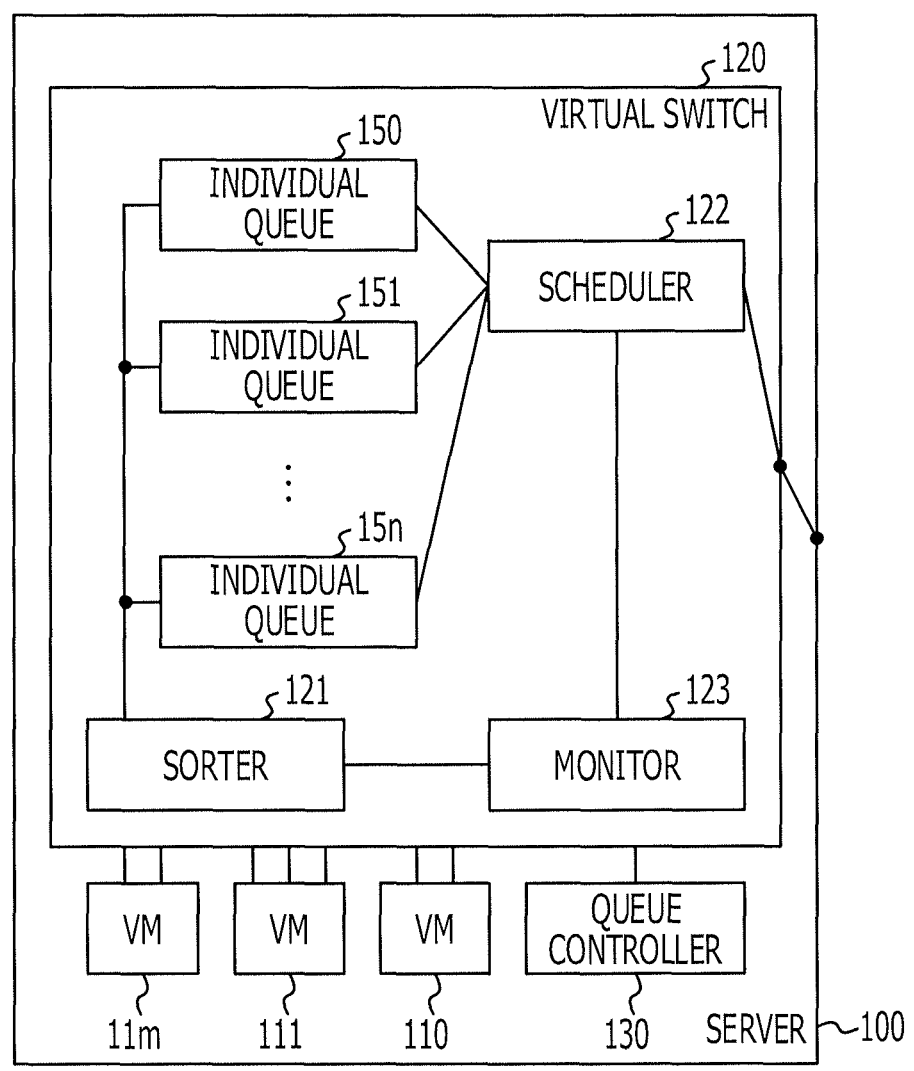
FIG. 3 illustrates an example of flows of virtual machines and queues.

FIG. 3 illustrates an example of flows of virtual machines and queues. Although a description will be given in connection with a server 100, a server 200 also has a similar execution state.

The server 100 illustrated in FIG. 3 includes multiple (m+1) virtual machines 110 to 11$m$, a virtual switch 120, and a queue controller 130. The virtual switch 120 includes a sorter 121, a scheduler 122, a monitor 123, and multiple (n+1) individual queues 150 to 15$n$. It is assumed that each of the virtual machines 110 to 11$m$ transmits multiple flows, for example, on the basis of the request source of the data or of whether or not the data is data for management. It is assumed that the number of flows provided by the virtual machines 110 to 11$m$ is n+1 and matches the number of individual queues 150 to 15$n$.

The queue controller 130 issues, to the virtual switch 120, an instruction for allocating the virtual machines 110 to 11$m$ to a total number of n+1 flows provided by the individual queues 150 to 15$n$, respectively. The sorter 121 sorts each flow into the individual queues 150 to 15$n$ and the scheduler 122 selects the individual queues 150 to 15$n$ in accordance with a predetermined regulation.

In a virtual environment, the selection of the individual queues 150 to 15$n$, the selection being executed by the scheduler 122, is processing executed using a processor, a memory controller, a memory, and so on in the server 100. That is, as the number of queues increases, the rate at which the scheduler 122 uses the processor, the memory controller, and the memory increases and thus the influence that the processing load of the scheduler 122 has on the server 100 increases. In this case, since the processing load of the scheduler 122 becomes a bottleneck, there are cases in which the bandwidth of an external link of the server 100 is not efficiently used.

Now, suppose a case in which one virtual machine executed in the server 200 is migrated to the server 100 illustrated in FIG. 3. Migration is executed, for example, to perform load balancing for migrating, when the processing load of a virtual machine executed in a server increases, another virtual machine to another server, to temporarily migrate a virtual machine in a server to another server in order to perform maintenance of that server, or to reduce the total power consumption by reducing the power supplied to a server that is not used since virtual machines are gathered in a specific server. Thus, the number of virtual machines that are migrated at once may be plural. When the number of virtual machines to be migrated is plural, there are cases in which the number of flows associated with one virtual machine is plural. In such a case, however, if those flows are allocated to the individual queues, respectively, after the migration, there is a possibility that the processing load involved in the scheduling increases significantly.

In such a case, the rate at which the scheduler 122 uses the processor, the memory controller, and the memory increases, which may affect throughput of the virtual machines already executed in the server 100. Additionally, since the processing load of the scheduler 122 becomes a bottleneck, the possibility that an operation is performed while the bandwidth of data to be transmitted is smaller than the bandwidth of the external link increases. In light of the foregoing description, in order to efficiently use the physical resources in the server 100 and the bandwidth of the external link, it is preferable that, even when a virtual machine is migrated, the number of queues be set on the basis of the number of flows and the bandwidth of each flow.

Meanwhile, it is conceivable to measure the bandwidth of a virtual machine after the migration thereof to thereby set the number of universal queues and the number of individual queues. In addition, since the number of flows increases as a result of the migration, there may be a case in which the load of the server decreases when the flows allocated to the individual queues are gathered in the universal queue.

However, as described above, since a certain amount of time is taken for measuring the bandwidth, there are cases in which, in a period in which the bandwidth after the migration is measured, the throughput of the already executed virtual machines is reduced or the bandwidth of the external link is not efficiently used.

Figure 4:
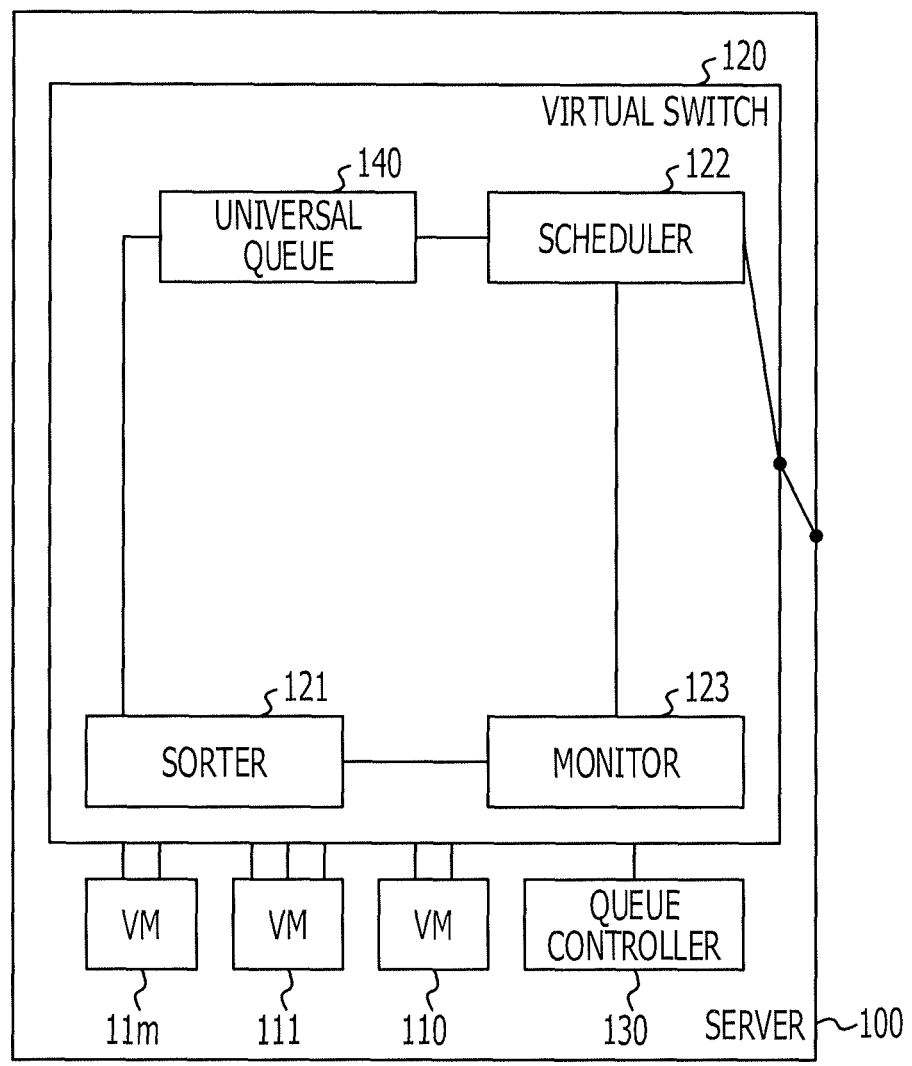
FIG. 4 illustrates another example of a relationship between flows provided by virtual machines and a transmission queue.

FIG. 4 illustrates another example of a relationship between flows provided by virtual machines and a transmission queue. Although a description in this case will be given in connection with a server 100, a server 200 also has a similar execution state.

The server 100 illustrated in FIG. 4 includes multiple (m+1) virtual machines 110 to 11$m$, a virtual switch 120, and a queue controller 130. The virtual switch 120 includes a sorter 121, a scheduler 122, a monitor 123, and a universal queue 140. It is assumed that each of the virtual machines 110 to 11$m$ transmits multiple flows, for example, on the basis of the request source of the data or of whether or not the data is data for management. It is assumed that all of the flows provided by the virtual machines 110 to 11$m$ are allocated to the universal queue 140.

When compared with the example in FIG. 3, the possibility that the processing load of the scheduler 122 becomes a bottleneck for communication is low since the processing in which the scheduler 122 sequentially selects multiple queues is not performed. However, when the bandwidths of the flows provided by the virtual machines 110 to 11$m$ are different from each other, there is a possibility that one flow having a large bandwidth occupies the universal queue 140. Also, there is a possibility that, depending on the order of flows stored in the universal queue 140, only data of a specific flow is transmitted to an external link of the server 100. That is, when all of the flows provided by the virtual machines 110 to 11$m$ are allocated to the universal queue 140, a flow having a small bandwidth is, in practice, more restricted than the bandwidth and an unbalance in transmission may occur between the flows.

Now, suppose a case in which one virtual machine executed in the server 200 is migrated to the server 100 illustrated in FIG. 4. As described above, there are cases in which the number of virtual machines to be migrated is plural and the number of flows associated with one virtual machine is plural. Thus, when the flows provided by the migrated virtual machines are gathered in the universal queue 140, there is a possibility that the bandwidth becomes unbalanced to squeeze the rate of transmission of the virtual machine already executed in the server 100.

Meanwhile, the arrangement may be such that the bandwidth of a migrated virtual machine is measured and the number of universal queues and the number of individual queues are re-set, for example, by separating the universal queue into individual queues, as appropriate. However, as described above, since a certain amount of time is taken for measuring the bandwidth, there are cases in which, in a period in which the bandwidth after the migration is measured, the server 100 operates with an unbalance occurring between multiple flows.

Figure 5:
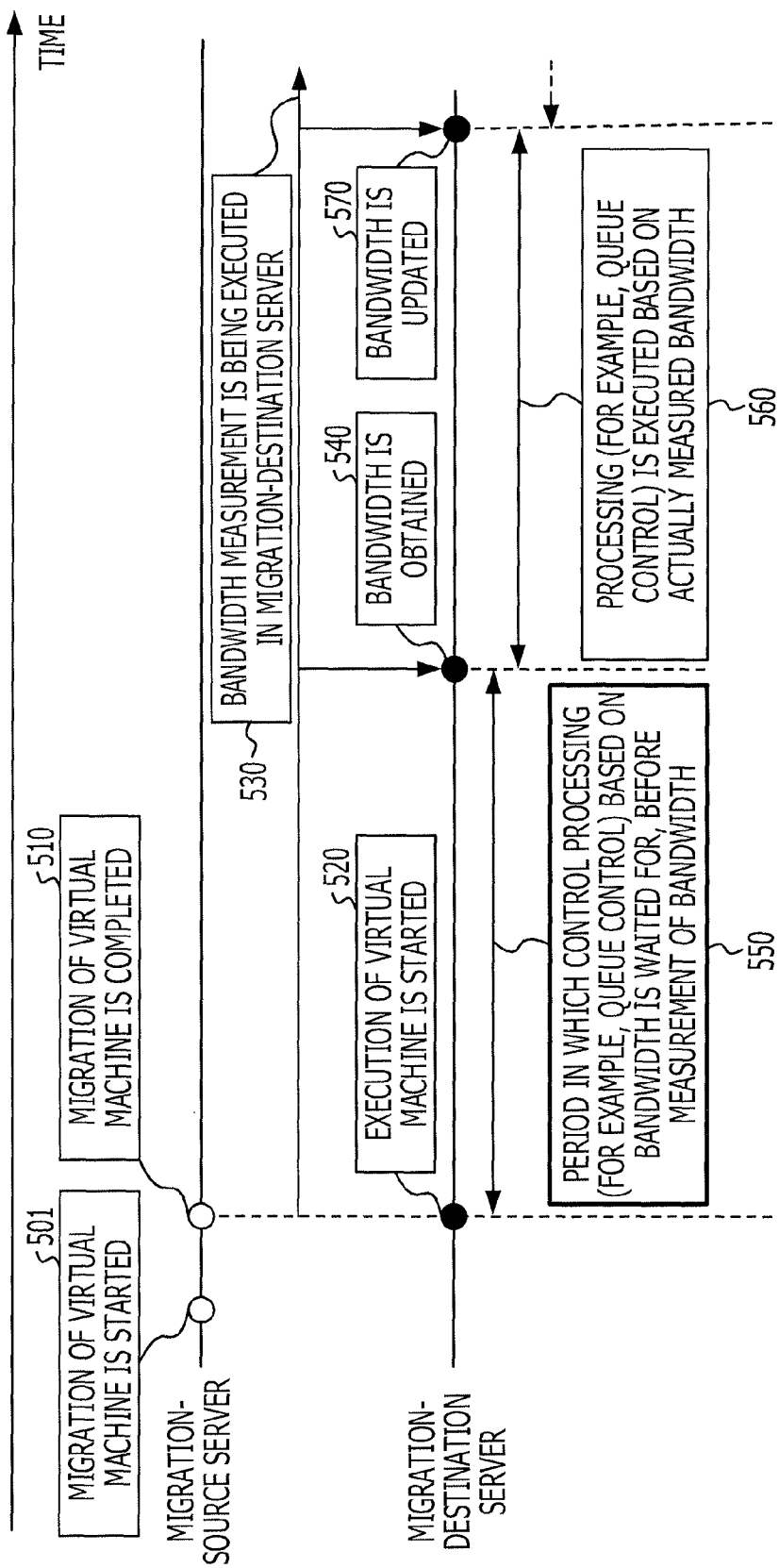
FIG. 5 illustrates an example of a relationship between migration of a virtual machine and processing based on a bandwidth of a flow.

FIG. 5 illustrates an example of a relationship between migration of a virtual machine and processing based on a bandwidth of a flow. At time 501, migration of a virtual machine from a migration-source server to a migration-destination server is started. At time 510, in the migration-source server, the migration of the virtual machine is completed. At time 520, the migrated virtual machine is executed in the migration-destination server.

When the virtual machine is executed in the migration-destination server, bandwidth measurement is executed in the migration-destination server in processing 530. A certain amount of time or more is taken for the bandwidth measurement. For example, when the virtual machine is executed as a web server, the virtual machine transmits data in response to a web request. Since the transmission of the data is dependent on the reception timing of the web request and processing details thereof, there are cases in which transmission timing of the data has no regularity. Thus, in order to measure the bandwidth of the virtual machine with high accuracy, the amount of data for a certain amount of time is measured. The amount of time during which the amount of data is measured may be, for example, on the order of a few minutes.

As is understood from the above description, the bandwidth of the virtual machine is measured in a period 550 from time 520 at which the virtual machine is executed until time 540 at which the bandwidth is obtained. Thus, since the bandwidth has not been obtained in the period 550 yet, processing based on the bandwidth (for example, the queue management illustrated in FIGS. 3 and 4) is not executed.

When the measurement of the bandwidth is completed at time 540, the operation enters a state in which processing based on the actually measured bandwidth is executable. That is, after time 540, for example, the assignment of a queue to each flow may be determined on the basis of the actually measured bandwidth, as indicated at processing 560.

After time 540, the measurement of the bandwidth in the migration-destination server is continuously performed, and at time 570, the bandwidth is updated to a newly measured bandwidth. Similarly, while the virtual machine is executed, the measurement of the bandwidth in the migration-destination server is continuously performed, so that the bandwidth is updated to a newly measured bandwidth. When multiple virtual machines are executed in the server, bandwidth measurement may be simultaneously executed on the multiple virtual machines or may be asynchronously executed on the individual virtual machines. When the bandwidth measurement is asynchronously executed, the bandwidth measurement is started after migration of one virtual machine, regardless of the start time of the bandwidth measurement of another virtual machine.

In the example illustrated in FIG. 5, since the bandwidth has not been obtained in the period 550 from time 520 at which the execution of the virtual machine is started until time 540, the server may operate in the queue management state (FIG. 3) in which the processing load of the scheduler 122 is large and in the queue management state (FIG. 4) in which an unbalance in the rate of transmission occurs.

In the migration-destination server, the virtual machine to be migrated and other virtual machines already executed in the migration-destination server before the migration share physical resources. Thus, there are cases in which, depending on physical resources that can be allocated in the migration-destination server, the physical resources to be allocated to the virtual machine to be migrated are varied, in an allowable range, from physical resources allocated to the virtual machine in the migration-source server. The bandwidth of the virtual machine may vary when the physical resources are varied or when an execution environment (for example, the number of flows) in the migration-destination server is different from an execution environment in the migration-source server. Consequently, even when the bandwidth of the virtual machine is actually measured in the migration-source server, the actually measured bandwidth may differ from the actually measured bandwidth of the virtual machine in the migration-destination server. Thus, there are cases in which it is difficult to determine processing by directly using the actually measured bandwidth in the migration-source server.

Meanwhile, when multiple virtual machines for multiple business operators are executed in one server in a mixed manner, migration of the virtual machine of one business operator may affect the operating state of the already executed virtual machine of another business operator. Business operators that provide services realized by virtual machines and users who receive the services desire a state in which the services are stably operated. Thus, it is desired that, even in the actual-bandwidth-measurement period after migration of a virtual machine, queue management for flows be appropriately executed instantaneously and the entire system operate stably before and after the migration. Such a situation is also desired by virtual-machine administrators and data-center administrators who executes stabilization, enhancement of the efficiency, reduction in the power, and so on of the entire system by migrating virtual machines on the basis of the operating states of servers and the operating states of the virtual machines.

FIG. 6 illustrates an example of the bandwidth profile in the information processing system according to the embodiment. The bandwidth profile is information stored in a memory 2100 (described below) illustrated in FIG. 13. In the bandwidth profile, a virtual-machine ID uniquely allocated by the management server 300 illustrated in FIG. 2, the bandwidth of a virtual machine, information indicating whether or not the bandwidth is an actually measured bandwidth, a CPU speed allocated to the virtual machine, and a NIC speed allocated to the virtual machine are associated with each other.

The example in FIG. 6 indicates that, when a CPU speed of 2 GHz and a NIC speed of 1 Gbps are allocated to a virtual machine with ID "1", the actually measured bandwidth is 200 Mbps. Instead of the ID of the virtual machine, an ID may be allocated to each flow of the virtual machine and the information illustrated in FIG. 6 may be associated with the ID for each flow. The ID of each flow may be uniquely allocated on the basis of identification information (as described above) contained in a packet in the flow.

FIG. 7 illustrates an example of a virtual machine profile in the information processing system according to the embodiment. The virtual machine profile is information stored in the memory 2100 (described below) illustrated in FIG. 13. In the virtual machine profile, a CPU speed allocated to a virtual machine and a NIC speed allocated to the virtual machine are associated with each other. The virtual machine profile is created on the basis of the setting information of a virtual machine in order to deploy the virtual machine. The setting information contains information, such as a CPU speed, the amount of memory, the speed of a virtual NIC, and a disk capacity, that are allocated to the virtual machine. The virtual machine profile is created on the basis of the setting information transmitted from the management server 300 to the corresponding server when the virtual machine is deployed or migrated. The example in FIG. 7 indicates that the CPU speed and the NIC speed allocated to the virtual machine are 3 GHz and 1 Gbps, respectively. As described below, the server that receives the bandwidth profile during migration of a virtual machine corrects the bandwidth indicated in the received bandwidth profile on the basis of the virtual machine profile stored in the memory 2100 in the local server.

FIG. 8 illustrates another example of the bandwidth profile in the information processing system according to the embodiment. This bandwidth profile is information stored in the memory 2100 (described below) illustrated in FIG. 13. In the bandwidth profile, an ID of a virtual machine, the bandwidth of the virtual machine, and information indicating whether or not the bandwidth is an actually measured bandwidth, a CPU speed allocated to the virtual machine, and a NIC speed allocated to the virtual machine are associated with each other. As described above, instead of the ID of the virtual machine, an ID may be allocated to each flow of the virtual machine and the information illustrated in FIG. 8 may be associated with the ID for each flow.

The example in FIG. 8 indicates that, as a result of allocation of a CPU speed of 3 GHz and a NIC speed of 1 Gbps to the virtual machine with ID "1" after migration thereof, the bandwidth "200 Mbps" actually measured in the migration-source server is corrected and the bandwidth in the migration-destination server is estimated to be 300 Mbps. The bandwidth correction is executed by utilizing the ratio of physical resources (for example, the physical resources in FIG. 6) allocated to the virtual machine in the migration-source server versus the physical resources (for example, the physical resources in FIG. 7) allocated to the virtual machine in the migration-destination server, multiplying the ratio by a coefficient reflecting the virtual-switch scheduling load that depends on the number of flows in the migration-destination server, or applying a restriction based on the virtual NIC speed allocated to the virtual machine in the migration-destination server or the upper-limit value of the bandwidth allocated based on the speed of the physical NIC in the migration-destination server.

The use of the corrected bandwidth (illustrated in FIG. 8) as a prediction value allows, for example, the queue management for flows to be executed even in the period (the period 550 in FIG. 5) in which the actual measurement of the bandwidth in the migration destination is waited for.

Virtual-machine migration is utilized, for example, to perform load balancing or maintenance or to gather virtual machines in a specific server. Thus, when the physical resources to be allocated to the virtual machine after the migration are varied from the physical resources allocated to the virtual machine before the migration or depending on the operating state (the number of flows) including other virtual machines in the migration-destination server, the bandwidth after the migration differs from the bandwidth actually measured in the migration-source server.

For example, when a virtual machine is executed as a web server, the virtual machine executes predetermined processing in response to a web request and transmits a result of the processing to the source of the web request. Since the processing executed by the virtual machine depends on the CPU speed allocated to the virtual machine, the amount of data transmitted to the source of the web request per unit time depends on the CPU speed allocated to the virtual machine. That is, the bandwidth of the virtual machine varies depending on the CPU speed allocated to the virtual machine. The bandwidth of the virtual machine is also restricted by the NIC speed allocated to the virtual machine. The bandwidth is also restricted by the ratio at which each queue is selected in the scheduling by the virtual switch. For example, when multiple virtual machines are executed, the total value of the amounts of data transmitted thereby is restricted by the NIC speed of the physical server. That is, the bandwidths of the virtual machines vary depending on the NIC speed of the physical server executed. As described above, when the situation of the physical resources to be allocated to the virtual machine or the server in which the virtual machine is executed is changed, the bandwidth of the virtual machine varies.

In order to also complete the migration, there are cases in which, depending on the remaining physical resources in the migration-destination server, the amount of physical resources to be allocated to a virtual machine is varied, in an allowable range, from the amount of physical resources allocated to the virtual machine in the migration-source server. In such cases, as described above, the bandwidth of the virtual machine varies when the processing capability of the virtual machine per unit time after the migration varies from the processing capability before the migration or when the upper-limit value of the virtual NIC changes.

In addition, the physical resources for executing the virtual switch are shared by the physical resources for executing the virtual machines. Thus, when the number of flows increases as a result of an increase in the number of virtual machines in the migration-destination server, the load of scheduling performed by the virtual switch increases. In this case, since the rate of CPU occupied by the virtual switch increases, the bandwidth of the virtual machine after migration may be more restricted than an intended bandwidth.

Accordingly, correcting the bandwidth actually measured in the migration-source server on the basis of a difference between the physical resources allocated to the virtual machine, a difference between the execution states in the server, and a NIC speed makes it possible to obtain a prediction value that is closer to the actually measured bandwidth of the bandwidth in the migration-destination server. The use of the high-accuracy prediction value allows, for example, the queue management for flows to be accurately executed even in the period (the period 550 in FIG. 5) in which the actual measurement of the bandwidth in the migration-destination server is waited for. When the physical resources allocated to the virtual machine in the migration-source server and the physical resources allocated to the virtual machine in the migration-destination server are substantially the same, the bandwidth actually measured in the migration-source server may be used as a prediction value without correction. A more detailed example of the bandwidth correction method is described later in conjunction with a description given with reference to FIG. 15.

FIG. 9 illustrates another example of the bandwidth profile in the information processing system according to the embodiment. This bandwidth profile is information stored in the memory 2100 (described below) illustrated in FIG. 13. In the bandwidth profile, an ID of a virtual machine, the bandwidth of the virtual machine, information indicating whether or not the bandwidth is an actually measured bandwidth, a CPU speed allocated to the virtual machine, and a NIC speed allocated to the virtual machine are associated with each other. As described above, instead of the ID of the virtual machine, an ID may be allocated to each flow of the virtual machine and the information illustrated in FIG. 9 may be associated with the ID for each flow.

The example in FIG. 9 indicates that, as a result of performing actual measurement of, in the migration-destination server, the bandwidth of the virtual machine with ID "1" to which a CPU speed of 3 GHz and a NIC speed of 1 Gbps are allocated, the actually measured bandwidth is 295 Mbps.

Figure 10:
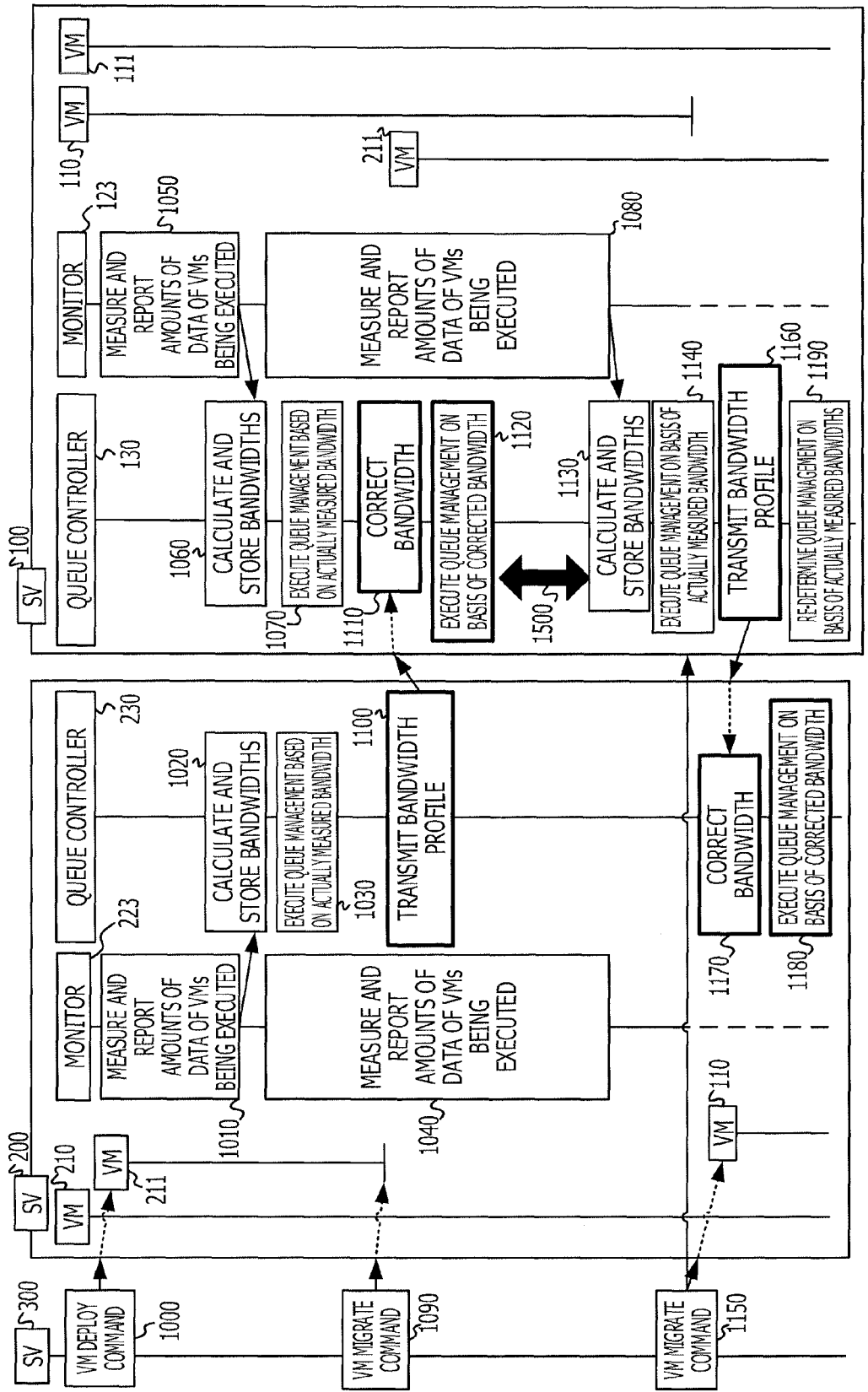
FIG. 10 illustrates an example of an operation of the information processing system according to the embodiment.

FIG. 10 illustrates an example of an operation of the information processing system according to the embodiment. A description in this case will be given of an example in which, in accordance with a command from a management server 300, a virtual machine 211 executed in a server 200 is migrated to a server 100 and then a virtual machine 110 executed in the server 100 is migrated to the server 200. In conjunction with this example, a description will be given of movement of the bandwidth profile in the embodiment, the correction of the bandwidth, and flow management based on the corrected bandwidth. In FIG. 10, each server is represented as SV.

First, it is assumed that the virtual machine 110 and a virtual machine 111 are executed in the server 100 and a virtual machine 210 is executed in the server 200. In this case, the management server 300 issues, to the server 200, a virtual-machine deploy command 1000 for deploying the virtual machine 211. Setting information containing a CPU speed, a memory, a virtual NIC speed, and disc information allocated to the virtual machine 211 is reported to the server 200 in conjunction with the virtual-machine deploy command 1000. The virtual-machine deploy command 1000 and the setting information are received by the server 200, in which the virtual machine 211 is executed on the basis of the setting information.

A monitor 223 executed in the server 200 executes processing 1010 for measuring the amounts of data of the virtual machines 210 and 211. For example, the monitor 223 monitors, for a predetermined period of time, flows provided by the virtual machines 210 and 211 that are being executed, to measure the amounts of data to be transmitted by the virtual machines 210 and 211 in the predetermined period. When the amounts of data of the virtual machines 210 and 211 that are being executed are measured in processing 1010, the measured amounts of data are reported to a queue controller 230. The amount of data of the virtual machine 210 and the amount of data of the virtual machine 211 may be simultaneously measured and be reported to the queue controller 230 or the amount of data of the virtual machine 210 and the amount of data of the virtual machine 211 may be asynchronously measured and be reported to the queue controller 230. When the amounts of data are asynchronously measured, for example, the bandwidth measurement is started after deployment of the virtual machine 211, regardless of the start time of the bandwidth measurement of the virtual machine 210.

The queue controller 230 executed in the server 200 computes bandwidths on the basis of the amounts of data measured by the monitor 223 and executes processing 1020 for storing the calculated bandwidths in the memory 2100 (described below) as bandwidth profiles. The queue controller 230 calculates each bandwidth, for example, by dividing the amount of data of each flow of the virtual machines 210 and 211, the amount of data being measured by the monitor 223, by the predetermined period in which the monitoring is performed. That is, the calculated bandwidth is based on the actually measured amount of data. Thus, in the bandwidth profile, information "M" indicating actual measurement is associated with the value of the bandwidth, as illustrated in FIG. 6. This bandwidth may also be referred to as an "actual-measurement bandwidth".

The queue controller 230 executes processing 1030 for executing queue management based on the actual-measurement bandwidth. For example, the arrangement may be such that, when the actual-measurement bandwidth of a flow is larger than a value obtained by dividing the bandwidth of an external link connected to the server 200 by the number of flows in the server 200, the flow is allocated to the individual queue and the scheduler selects the individual queue at a rate at which the bandwidth of the flow is ensured. Other flows whose actual-measurement bandwidths are smaller are allocated so as to be integrated into the universal queue. As a result of such queue management, fairness in the flows in the server 200 being transmitted to the external link is ensured and the number of queues in the server 200 is reduced. Consequently, the processing load involved in the queue scheduling is reduced.

As illustrated at processing 1040, the monitor 223 in the server 200 continuously executes the processing for measuring the amounts of data of the virtual machines being executed after processing 1020. The queue controller 230 continuously executes the calculation of actual-measurement bandwidths and the queue management in conjunction with the processing performed by the monitor 223. In FIG. 10, illustration of part of the above-described processing is omitted.

On the other hand, the monitor 123 executed in the server 100 executes processing 1050 for measuring the amounts of data of the virtual machines 110 and 111. For example, the monitor 123 monitors, for a predetermined period of time, flows provided by the virtual machines 110 and 111 that are being executed, to measure the amounts of data to be transmitted by the virtual machines 110 and 111 in the predetermined period. When the amounts of data of the virtual machines 110 and 111 being executed are measured in processing 1050, the measured amounts of data are reported to the queue controller 130.

The queue controller 130 executed in the server 100 calculates bandwidths on the basis of the amounts of data measured by the monitor 123 and executes processing 1060 for storing the calculated bandwidths in the memory 2100 (described below) as bandwidth profiles. The queue controller 130 calculates each bandwidth, for example, by dividing the amount of data of each flow of the virtual machines 110 and 111, the amount of data being measured by the monitor 123, by the predetermined period in which the monitoring is performed. Since the calculated bandwidth is based on the actually measured amount of data, information "M" indicating actual measurement, in the bandwidth profile, is associated with the value of the bandwidth, as illustrated in FIG. 6. This bandwidth may also be referred to as an "actual-measurement bandwidth".

The queue controller 130 executes processing 1070 for executing queue management based on the actual-measurement bandwidths. For example, the arrangement may be such that, when the actual-measurement bandwidth of a flow is larger than a value obtained by dividing the bandwidth of the external link connected to the server 100 by the number of flows in the server 100, the flow is allocated to the individual queue and the scheduler selects the individual queue at a rate at which the bandwidth of the flow is ensured. Other flows whose actual-measurement bandwidths are smaller are allocated so as to be integrated into the universal queue. As a result of such queue management, fairness in the flows in the server 100 being transmitted to the external link is ensured and the number of queues in the server 100 is reduced. Consequently, the processing load involved in the queue scheduling is reduced.

As illustrated at processing 1080, the monitor 123 in the server 100 continuously executes the processing for measuring the amounts of data of the virtual machines being executed after processing 1050. The queue controller 130 continuously executes the calculation of actual-measurement bandwidths and the queue management in conjunction with the processing performed by the monitor 123. In FIG. 10, illustration of part of the above-described processing is omitted.

The management server 300 reports, to the servers 200 and 100, a virtual-machine migrate command 1090 for migrating the virtual machine 211, executed in the server 200, to the server 100. Upon receiving the virtual-machine migrate command 1090, the server 200 transmits the setting information of the virtual machine 211 to the server 100 to suspend the virtual machine 211. Upon receiving the setting information of the virtual machine 211, the server 100 executes the virtual machine 211. When the setting of the virtual machine 211 executed in the server 100 is modified in accordance with the usage situation of the physical resources in the server 100 as a result of the migration, modified setting information including a CPU speed, a memory, a virtual NIC speed, and disc information to be allocated is reported from the management server 300 to the server 100. On the basis of the modified setting information, the virtual machine 211 is executed in the server 100.

Meanwhile, at the point when the virtual machine 211 is migrated to the server 100, the bandwidth of the virtual machine 211 has not been measured in the server 100. Since the virtual machine 211 does not perform queue management for one or more flows in the period in which the measurement of the bandwidth of the virtual machine 211 is waited for, there is a possibility that the load involved in the scheduling in the server 100 increases. In addition, since the rate at which the flows that already present in the server 100 are selected is reduced, there is a possibility that fairness in the flow selection is not ensured.

Accordingly, as described below, even in a period 1500 until the bandwidth of the virtual machine 211 is measured, the bandwidth of the virtual machine 211 in the migration-destination server is predicted through utilization or correction of the actually measured bandwidth of the virtual machine 211 in the migration-source server and queue management is executed.

In the server 200 that has received the virtual-machine migrate command 1090, the queue controller 230 executes processing 1100 for transmitting, to the server 100, not only the setting information of the virtual machine 211 but also the bandwidth profile illustrated in FIG. 6. The bandwidth profile transmitted in processing 1100 is not limited to the example illustrated in FIG. 6. In this case, however, a description will be given of an example in which the ID of the virtual machine 211 is "1" and the actual-measurement bandwidth in the server 200 is 200 Mbps when the CPU speed and the NIC speed allocated to the virtual machine 211 are 2 GHz and 1 Gbps, respectively.

In the server 100, the queue controller 130 receives the bandwidth profile transmitted in processing 1100 and executes processing 1110 for correcting the actually measured bandwidth of the virtual machine 211 in the server 200. A description will be given of an example in which the physical resources allocated to the virtual machine 211 executed in the server 100 are changed such that, as illustrated in FIG. 7, the CPU speed is changed to 3 GHz and the NIC speed is changed to 1 Gbps.

In processing 1110, the queue controller 130 compares the physical resources, which are allocated to the virtual machine 211 in the migration-source server 200 and are indicated in the bandwidth profile, with the physical resources, which are to be allocated to the virtual machine 211 in the migration-destination server 100 and are indicated in the virtual machine profile, to correct the bandwidth of the virtual machine 211, the bandwidth being indicated in the bandwidth profile (FIG. 6). The bandwidth profile is updated with the corrected bandwidth and an identifier is changed from "M" to "E" in order to indicate that the bandwidth is a corrected bandwidth. The updated bandwidth profile (FIG. 8) is stored in the memory 2100 in the server 100.

For example, in the server 200, the CPU speed and the NIC speed allocated to the virtual machine 211 are 2 GHz and 1 Gbps, respectively. In contrast, in the server 100, the CPU speed and the NIC speed allocated to the virtual machine 211 are 3 GHz and 1 Gbps, respectively, so that the CPU speed in the environment in which the virtual machine is executed is 1.5 times the CPU speed in the server 200. Accordingly, the queue controller 130 corrects the bandwidth actually measured in the server 200, regarding that the bandwidth is 300 Mbps when the virtual machine 211 is executed in the server 100. When the operating state of the physical resources to be allocated to the virtual machine after the migration is not substantially varied from the operating state of the physical resources allocated to the virtual machine before the migration, processing 1110 may be omitted. That is, the actual-measurement bandwidth in the migration-source server may be directly used. When the number of flows increases in the environment in which the virtual machine 211 is executed, there are cases in which the processing load for scheduling those flows restricts the bandwidths of the virtual machines. Thus, a bandwidth that is smaller than 300 Mbps may be used as the corrected bandwidth. Such a bandwidth may be determined by multiplying, on the basis of the number of flows being executed, 300 Mbps by a coefficient of 1 or smaller that depends on the number of flows predetermined in a test environment or the like. In addition, the bandwidth is also restricted by the virtual NIC speed allocated to the virtual machine 211 after the migration and the physical NIC capability of the server in which the virtual machine 211 is executed. Thus, when the corrected speed is higher than or equal to either of those interface speeds, the interface speed (the upper-limit value) may be used instead as the corrected bandwidth. In the example in FIG. 8, since the NIC speed allocated to the virtual machine is 1 Gbps, 300 Mbps determined by the correction is used as the bandwidth of the virtual machine 211.

The queue controller 130 executes processing 1120 for performing queue management on the basis of the corrected bandwidth. For example, when the virtual machine 211 is migrated to the server 100, this means that one or more flows provided by the virtual machine 211 increase in the server 100. When a value obtained by dividing the bandwidth of the external link by the total value of the number of flows provided by the virtual machines 110 and 111 and the number of flows increased by the virtual machine 211 is smaller than the corrected bandwidth (300 Mbps in the above-described case), the flows of the virtual machine 211 may be gathered in the universal queue. In this case, even when the virtual machine 211 is migrated, the number of queues does not increase and thus an increase in the load for the queue scheduling is suppressed. On the other hand, when the corrected bandwidth (300 Mbps in the above-described case) is larger than the value obtained by dividing the bandwidth of the external link by the total value of the number of flows in the server 100 after the migration of the virtual machine 211, the flows of the virtual machine 211 are allocated to the individual queues. In this case, while the bandwidth of the virtual machine 211 is maintained, fairness in the rate at which the flows of the virtual machine 211 and other flows are selected in the scheduling is maintained.

The queue controller 130 designates which of the storage areas prepared as queues in the register, the memory, or the FIFO buffer included in the server 100 are to be selected as the universal queue and the individual queues, so that the designated storage areas (for example, addresses in the memory) and the flows (for example, combinations of source addresses and destination addresses) are associated with each other. The queue controller 130 issues, to the sorter 121, a command for sorting the flows in accordance with those associated pieces of information.

The monitor 123 measures the amounts of data of the virtual machines 110, 111, and 211 executed in the server 100 and executes processing 1080 for reporting the measured amounts of data to the queue controller 130. The processing details of processing 1080 are substantially the same as the processing details of processing 1050 described above, so that descriptions thereof are omitted hereinafter.

The queue controller 130 calculates the bandwidths of the virtual machines 110, 111, 211 on the basis of the amounts of data measured in processing 1080 and executes processing 1130 for storing the determined bandwidths in the memory 2100 (described below) as the bandwidth profiles. Since processing details of processing 1130 are substantially the same as the processing details of processing 1060 described above, descriptions thereof are omitted hereinafter.

When the bandwidths are calculated and the bandwidth profiles are updated in processing 1130, the queue controller 130 executes processing 1140 for performing queue management on the basis of the actually measured bandwidths. At the point, when processing 1140 is executed, the bandwidth profile in the virtual machine 211 is updated to a bandwidth profile (as illustrated in FIG. 9) in processing 1130. That is, in this case, 295 Mbps is obtained as the actual-measurement bandwidth of the virtual machine 211 to which a CPU speed of 3 GHz and a NIC speed of 1 Gbps are allocated. In processing 1140, the queue controller 130 executes queue management for the flows of the virtual machine 211 on the basis of the measured bandwidth, not the corrected bandwidth. For example, changes may be made so that the flows of the virtual machine 211 which have been allocated to the universal queue on the basis of the corrected bandwidth are allocated to the individual queues in accordance with the measured bandwidth. In addition, changes may be made so that the flows of the virtual machine 211 which have been allocated to the individual queues on the basis of the corrected bandwidth are allocated to the universal queue in accordance with the measured bandwidth.

As described above, even in the period 1500 until the bandwidth of the virtual machine 211 is measured, the bandwidth of the virtual machine 211 in the migration-destination server is predicted through utilization or correction of the actually measured bandwidth of the virtual machine 211 in the migration-source server and queue management is executed. After the bandwidth of the virtual machine 211 is actually measured, queue management is executed on the basis of the actual-measurement bandwidth.

The management server 300 reports, to the servers 100 and 200, a virtual-machine migrate command 1150 for migrating the virtual machine 110, executed in the server 100, to the server 200. Upon receiving a virtual-machine migrate command 1150, the server 100 transmits the setting information of the virtual machine 110 to the server 200 to suspend the virtual machine 110. Upon receiving the setting information of the virtual machine 110, the server 200 executes the virtual machine 110. When the setting of the virtual machine 110 executed in the server 200 is modified in accordance with the usage situation of the physical resources in the server 200 as a result of the migration, modified setting information including a CPU speed, a memory, a virtual NIC speed, and disc information to be allocated is reported from the management server 300 to the server 200. On the basis of the modified setting information, the virtual machine 110 is executed in the server 200.

The queue controller 130 executes processing 1160 for transmitting the bandwidth profile of the virtual machine 110 to the server 200. Since processing details of processing 1160 are substantially the same as the processing details of processing 1100 described above, descriptions thereof are omitted hereinafter.

The queue controller 230 executes processing 1170 for correcting the bandwidth of the virtual machine 110 in accordance with the bandwidth profile transmitted in processing 1160 and the virtual machine profile of the server 200, the virtual machine profile being stored in the memory 2100 in the server 200. Since processing details of processing 1170 are substantially the same as the processing details of processing 1110 described above, descriptions thereof are omitted hereinafter.

The queue controller 230 executes processing 1180 for performing queue management on the basis of the corrected bandwidth of the virtual machine 110. Since processing details of processing 1180 are substantially the same as the processing details of processing 1120 described above, descriptions thereof are omitted hereinafter.

Meanwhile, after the virtual machine 110 is migrated from the server 100 to the server 200, the virtual machines 111 and 211 have been executed in the server 100. In this case, the bandwidths of the virtual machines 111 and 211 are still being measured. However, since the flows provided by the virtual machine 110 have been removed from the server 100, the queue controller 130 may execute processing 1190 for re-determining the queue management for the virtual machines 111 and 211 on the basis of the obtained measured bandwidths.

For example, since the number of flows in the server 100 is reduced as a result of the migration of the virtual machine 110, the number of queues to be allocated to those flows may be increased as long as the processing load of the scheduling does not become a bottleneck for communication. In this case, since the flows allocated to the universal queue are allocated to the individual queues, the rates at which the respective flows are transmitted to the external link are more equalized regardless of the timing at which the sorter 121 sorts the flows into the universal queue.

Figure 11A:
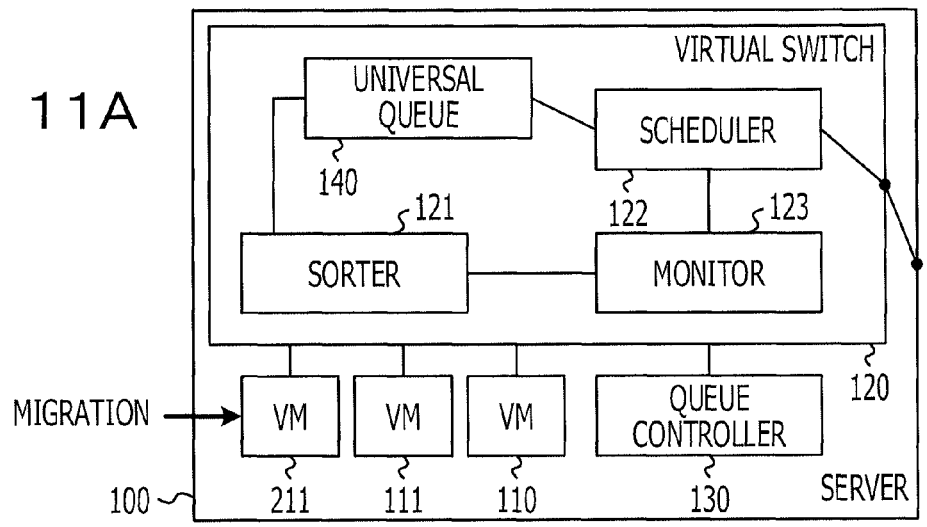
FIGS. 11A to 11C illustrate an example of queue management when migration of the virtual machine is executed in the information processing system according to the embodiment.
Figure 11B:
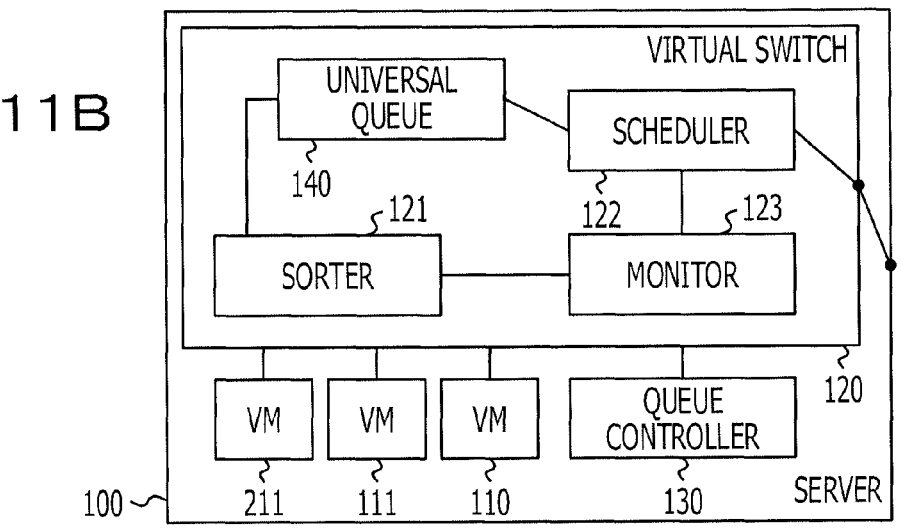
Figure 11C:
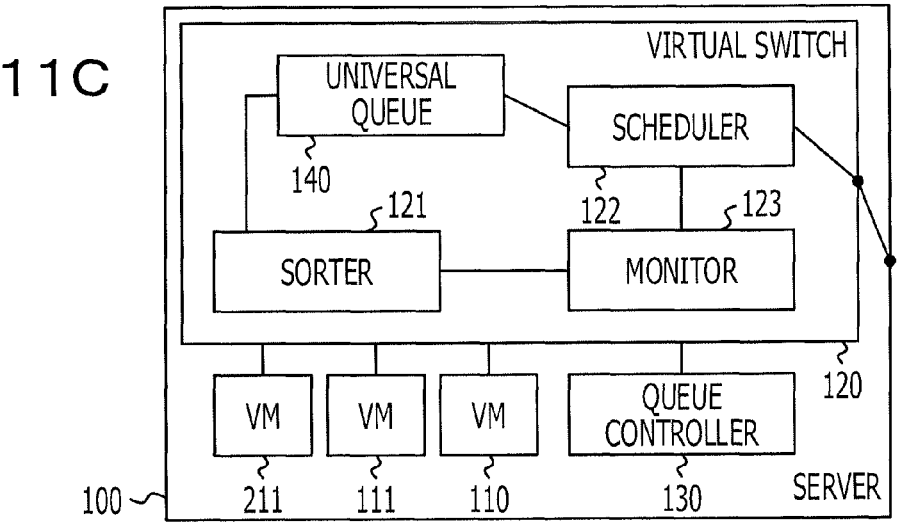

FIGS. 11A to 11C illustrate an example of queue management when migration of the virtual machine is executed in the information processing system according to the embodiment. In this case, a description will be given of an example in which, as a result of correction of the bandwidth of the virtual machine to be migrated, the bandwidth of the virtual machine becomes smaller than the value actually measured in the migration-source server. Elements denoted by the same reference numerals as those in FIG. 2 are not described hereinafter. A description in this case is given of an example in which the virtual machine 211 is migrated from the server 200 to the server 100.

FIG. 11A illustrates the server 100 before a queue is allocated to a flow of the virtual machine 211 after the virtual machine 211 is migrated from the server 200 to the server 100. The sorter 121 has sorted the flows of the virtual machines 110 and 111 into the universal queue 140.

FIG. 11B illustrates the server 100 in which the queue management has been executed on the basis of the corrected bandwidth of the virtual machine 211. Since the corrected bandwidth of the virtual machine 211 was smaller than the value obtained by dividing the bandwidth of the external link by the number of flows in the server 100, the sorter 121 has sorted the flow of the virtual machine 211 into the universal queue 140.

FIG. 11C illustrates the server 100 in which the queue management has been executed on the basis of the actually measured bandwidth of the virtual machine 211. In this case, since the bandwidth of the virtual machine 211, the bandwidth being actually measured in the server 100, was smaller than the value obtained by dividing the bandwidth of the external link by the number of flows in the server 100, the sorter 121 has sorted the flow of the virtual machine 211 into the universal queue 140 in the same manner as the queue management illustrated in FIG. 11B. When the actually measured bandwidth of the virtual machine 211 is larger than the value obtained by dividing the bandwidth of the external link by the number of flows in the server 100, the sorter 121 may sort the flow of the virtual machine 211 into the individual queue.

As described above, the bandwidth profile is transmitted in conjunction with migration, the bandwidth included in the bandwidth profile is corrected as described above, and queue management is executed on the basis of the corrected bandwidth, that is, a more probable bandwidth, in the server in which the virtual machine is executed. This arrangement, therefore, makes it possible to perform queue management that is more suited to an actual operation, even in the period in which the actual measurement of the bandwidth is waited for. Accordingly, the queue management is executed without redundantly estimating the bandwidth. Thus, even before the actual measurement of the bandwidth is completed, the processing load of the scheduler 122 in the server 100 can be reduced.

In a virtual environment, since the processing of the scheduler 122 is executed using resources, such as a CPU 2000 (described below) and the memory 2100, included in the server 100, the processing load increases as the number of queues increases. Accordingly, performing, instantaneously after the virtual machine is migrated, queue management on the basis of the bandwidth that is suited for an actual operation offers special advantages.

Figure 12A:
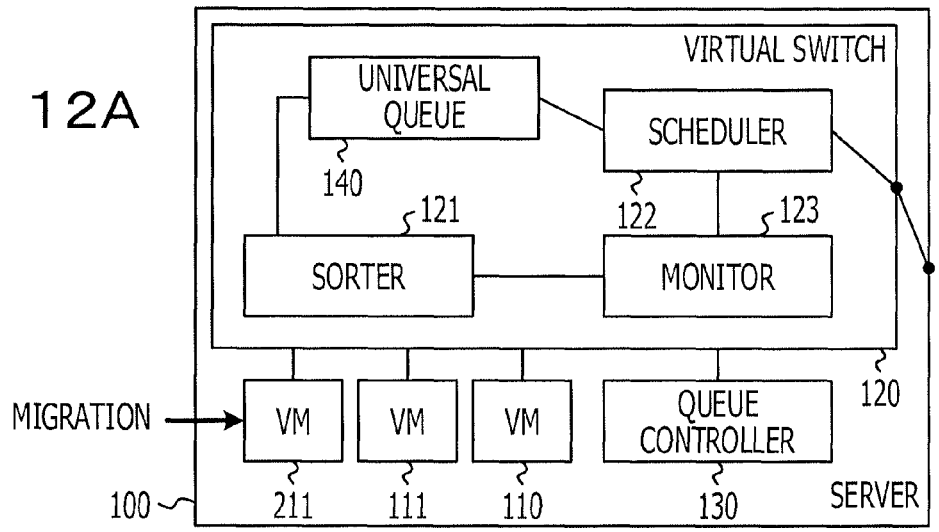
FIGS. 12A to 12C illustrate an example of queue management when migration of the virtual machine is executed in the information processing system according to the embodiment.
Figure 12B:
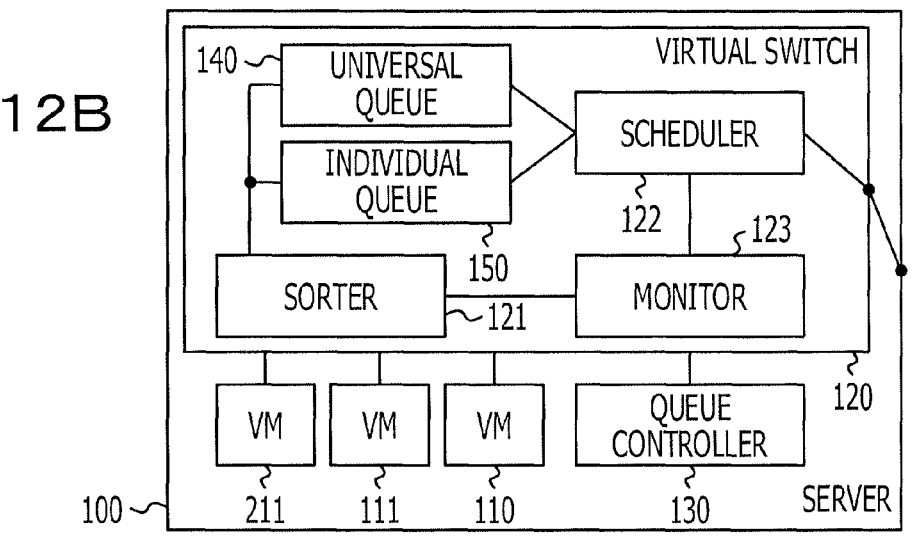
Figure 12C:
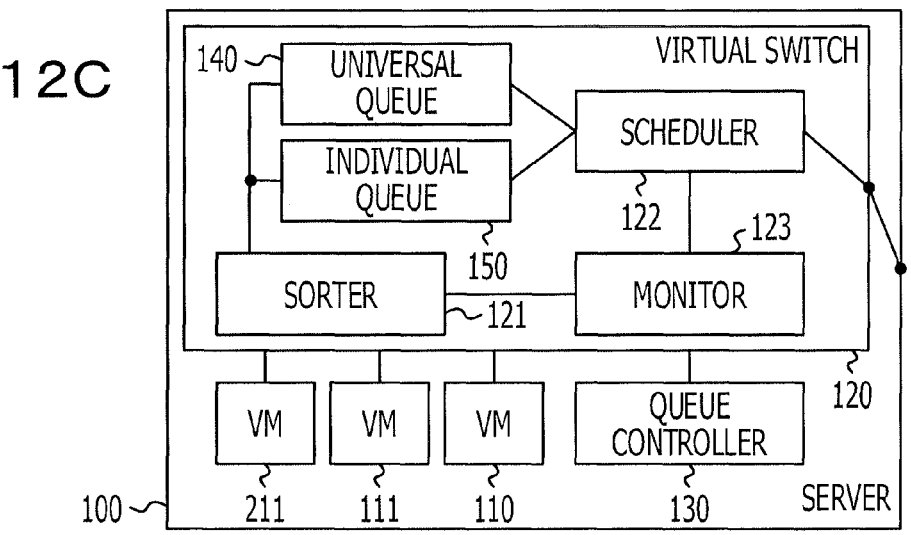

FIGS. 12A to 12C illustrate another example of queue management when migration of the virtual machine is executed in the information processing system according to the embodiment. A description below will be given of an example in which, as a result of correcting, in the migration-destination server, the bandwidth of a virtual machine to be migrated, the bandwidth becomes larger than a value actually measured in the migration-source server. Elements denoted by the same reference numerals as those in FIG. 2 are not described hereinafter.

FIG. 12A illustrates the server 100 before a queue is allocated to a flow of the virtual machine 211 after the virtual machine 211 is migrated from the server 200 to the server 100. The sorter 121 has sorted the flows of the virtual machines 110 and 111 into the universal queue 140.

FIG. 12B illustrates the server 100 in which the queue management has been executed on the basis of the corrected bandwidth of the virtual machine 211. Since the corrected bandwidth of the virtual machine 211 is larger than the value obtained by dividing the bandwidth of the external link by the number of flows in the server 100, the sorter 121 has sorted the flow of the virtual machine 211 into the individual queue 150.

FIG. 12C illustrates the server 100 in which the queue management has been executed on the basis of the actually measured bandwidth of the virtual machine 211. Since the bandwidth of the virtual machine 211, the bandwidth being actually measured in the server 100, is larger than the value obtained by dividing the bandwidth of the external link by the number of flows in the server 100, the sorter 121 has sorted the flow of the virtual machine 211 into the individual queue 150 in the same manner as the queue management illustrated in FIG. 12B. When the actually measured bandwidth of the virtual machine 211 is smaller than the value obtained by dividing the bandwidth of the external link by the number of flows in the server 100, the sorter 121 may sort the flow of the virtual machine 211 into the universal queue 140.

As described above, the bandwidth profile is transmitted in conjunction with migration, the bandwidth included in the bandwidth profile is corrected as described above, and queue management is executed on the basis of the corrected bandwidth, that is, a more probable bandwidth, in the server in which the virtual machine is executed. Thus, queue management that is more suited to an actual operation is executed even in the period in which the actual measurement of the bandwidth is waited for.

In a virtual environment, there are cases in which multiple virtual machines are executed in one server, and those virtual machines may or may not belong to the same user (business operator). Thus, when the queue management has not been performed in a preferable manner after execution of migration, there are cases in which the rate at which transmission for an already executed virtual machine of another user (business operator) is selected is squeezed and fairness in the rate at which transmission is selected is not ensured. Thus, when migration is executed in a virtual environment in which virtual machines provided by multiple users (business operators) are executed in one server, instantaneously performing queue management based on the bandwidth that is suited to the actual operation even before completion of the actual measurement of the bandwidth is preferable in terms of quickly maintaining the fairness in the transmission after the migration.

Figure 13:
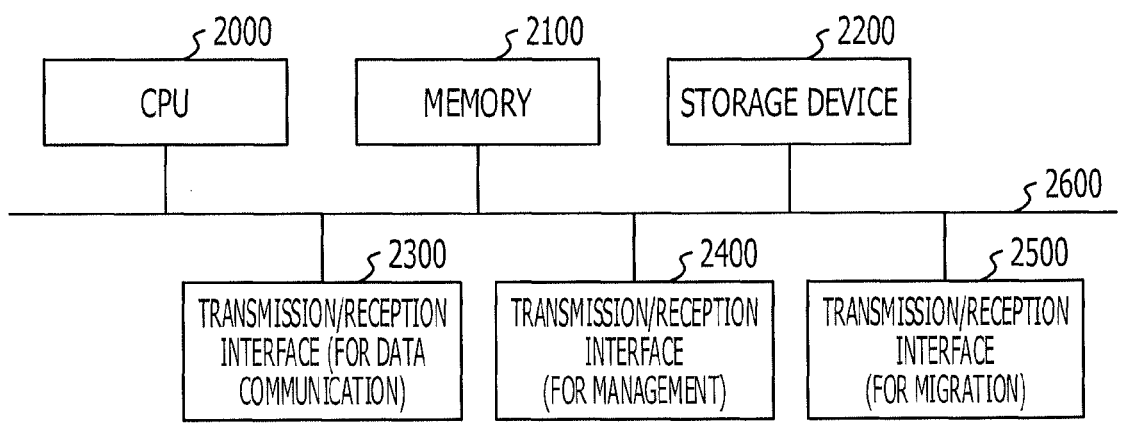
FIG. 13 illustrates the hardware configuration of a server according to the embodiment.

FIG. 13 illustrates the hardware configuration of the server (100, 200) according to the embodiment. Each of the servers 100 and 200 is a computer that has the CPU 2000, the memory 2100, a storage device 2200, a transmission/reception interface (for data communication) 2300, a transmission/reception interface (for management) 2400, a transmission/reception interface (for migration) 2500, and a bus 2600 to which those elements connected.

The CPU 2000 includes one or more processors for executing processing. The memory 2100 is, for example, a random access memory (RAM). The storage device 2200 is, for example, a nonvolatile memory, such as a read only memory (ROM) or flash memory, or a magnetic disk device, such as a hard disk drive (HDD). The transmission/reception interface (for data communication) 2300 is an interface for transmitting/receiving data to/from an external apparatus and is, for example, an interface circuit, a communication circuit, a communication control circuit, or a circuit in a network interface card or the like. The transmission/reception interface (for data communication) 2300 is connected to the network 500 illustrated in FIG. 2. The transmission/reception interface (for management) 2400 is an interface for transmitting/receiving data for management and is, for example, an interface circuit, a communication circuit, a communication control circuit, or a circuit in a network interface card or the like. The transmission/reception interface (for management) 2400 is connected to the management server 300 illustrated in FIG. 2. The transmission/reception interface (for migration) 2500 is an interface for transmitting/receiving data for management and is, for example, an interface circuit, a communication circuit, a communication control circuit, or a circuit in a network interface card or the like. The transmission/reception interface (for migration) 2500 is connected to the switch 400 illustrated in FIG. 2.

Figure 14:
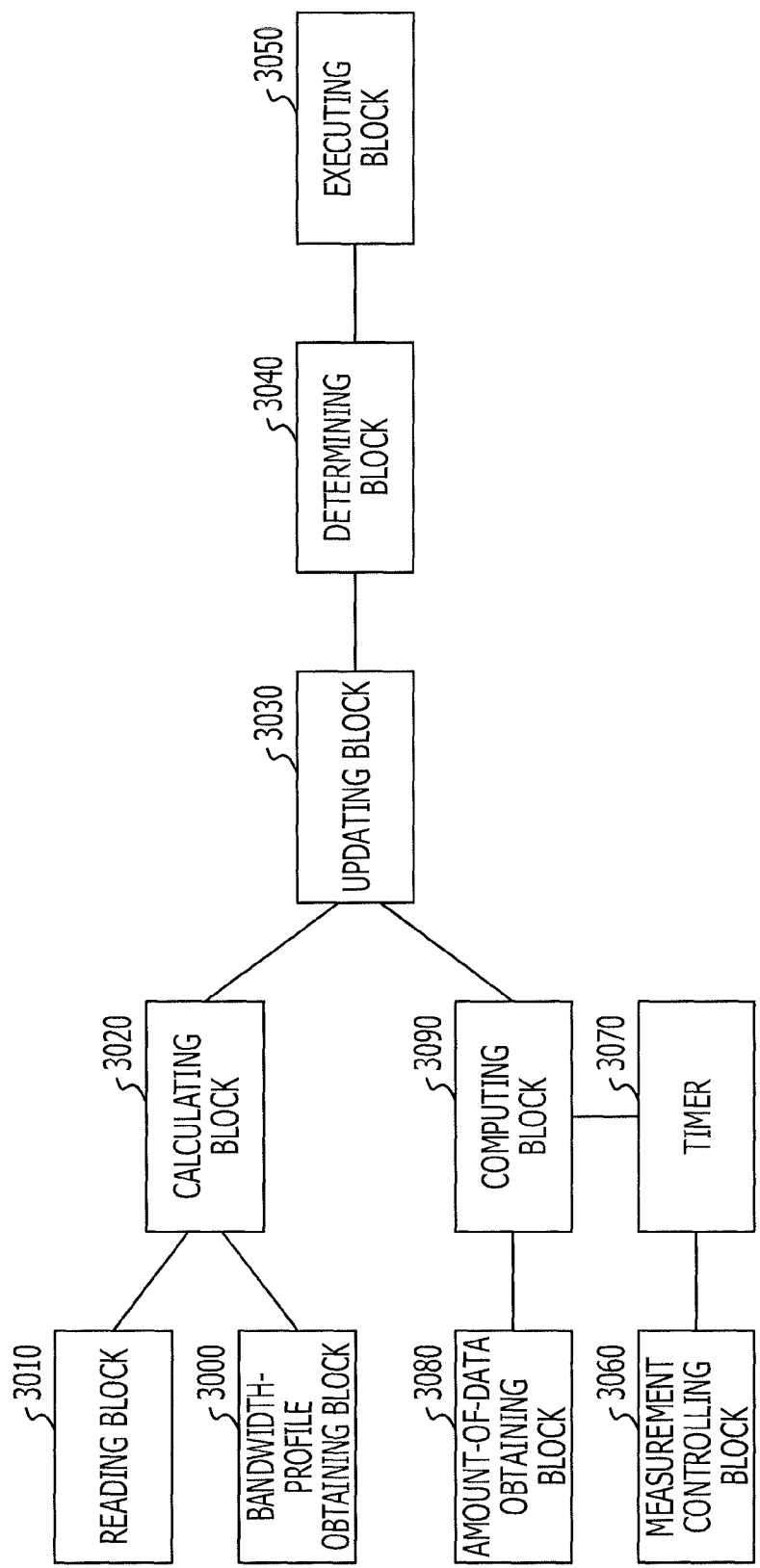
FIG. 14 illustrates functional blocks in a queue controller in the server according to the embodiment.
Figure 15:
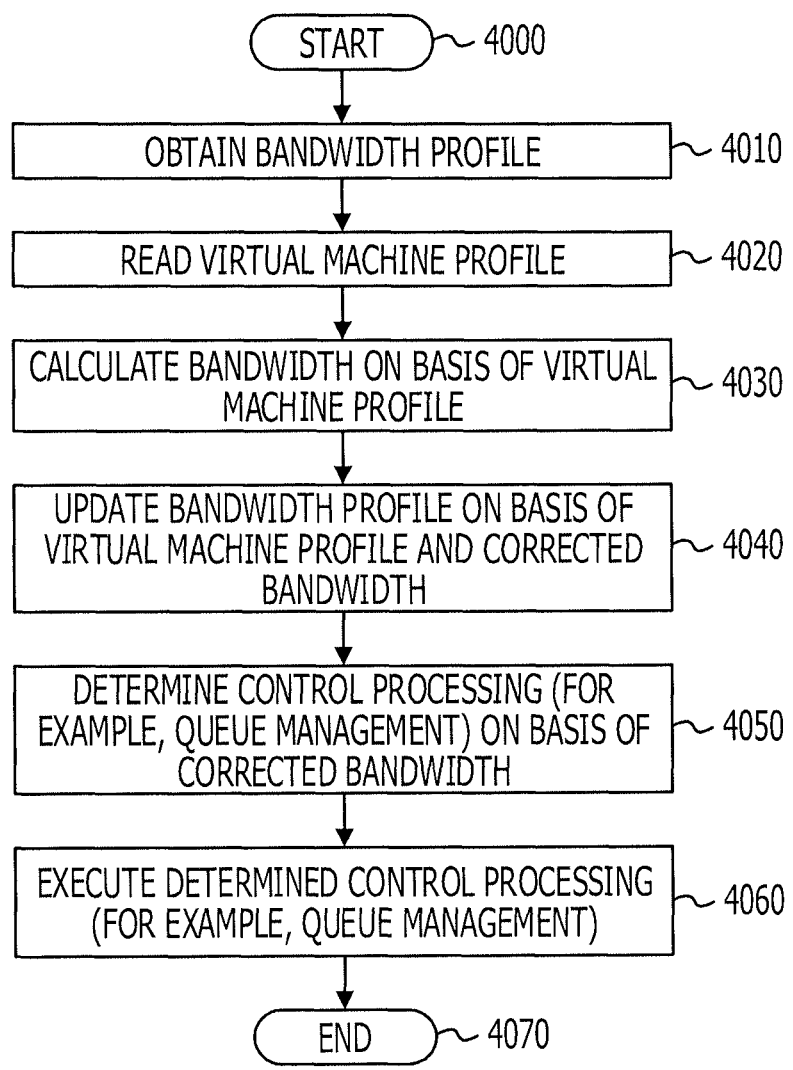
FIG. 15 illustrates processing executed by the queue controller in the server according to the embodiment.
Figure 16:
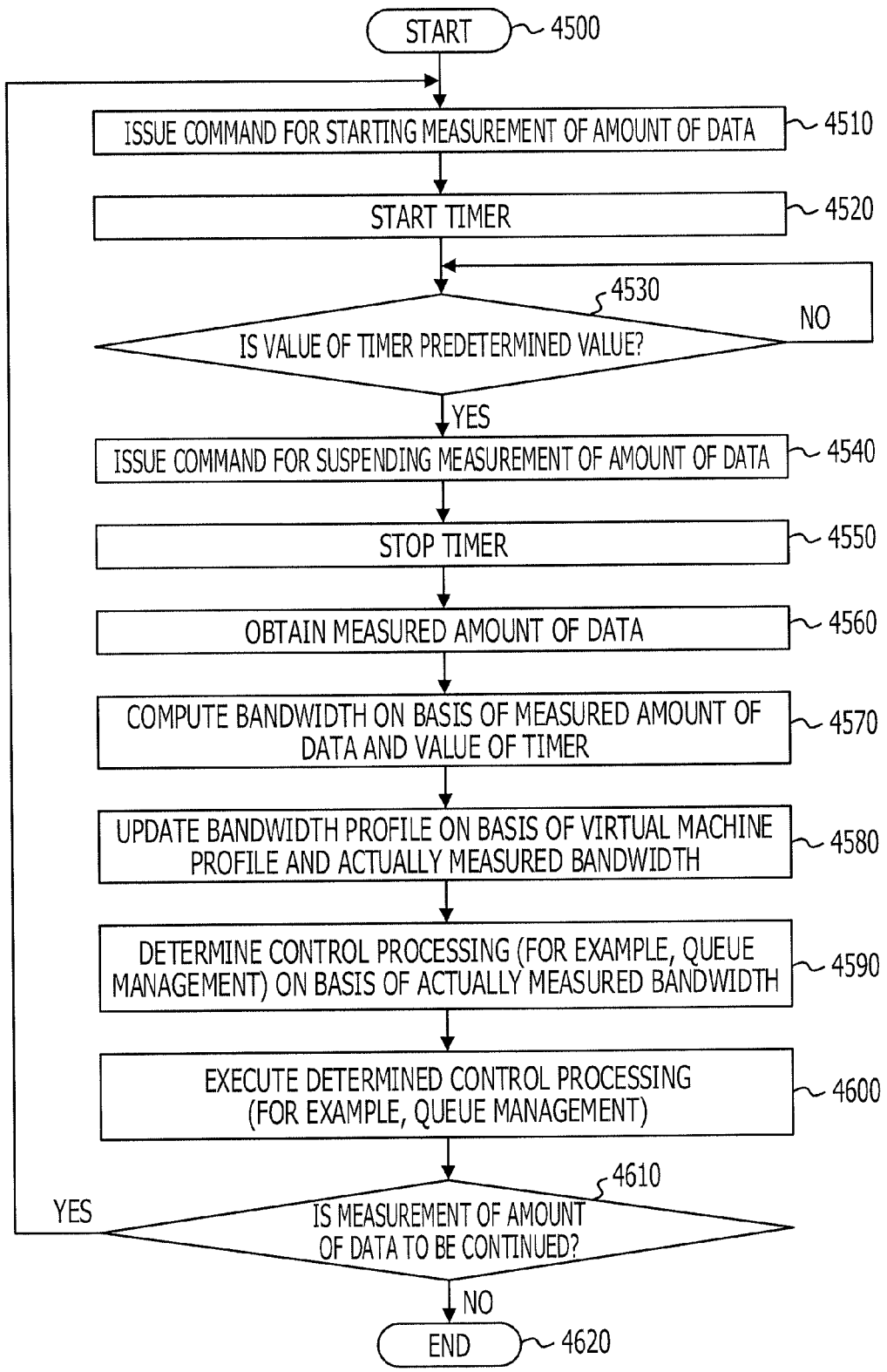
FIG. 16 illustrates other processing executed by the queue controller in the server according to the embodiment.

A program stating processing for controlling the operations of the servers 100 and 200 and a program stating processing illustrated in FIGS. 15 and 16 are stored in the memory 2100. The CPU 2000 executes the programs, stored in the memory 2100, to control the operations of the servers 100 and 200, so that the servers 100 and 200 function as the functional blocks illustrated in FIGS. 14 and 17.

FIG. 14 illustrates functional blocks in the queue controller (130, 230) in the server (100, 200) according to the embodiment. The CPU 2000 executes the programs, stored in the memory 2100, to thereby cause each of the queue controllers 130 and 230 to function as a bandwidth-profile obtaining block 3000, a reading block 3010, a calculating block 3020, an updating block 3030, a determining block 3040, an executing block 3050, a measurement controlling block 3060, a timer 3070, an amount-of-data obtaining block 3080, and a computing block 3090. Processing executed by each functional block is described below in connection with the processing illustrated in FIGS. 15 and 16.

FIG. 15 illustrates processing executed by the queue controller (130, 230) in the server (100, 200) according to the embodiment. The server that is included in the servers 100 and 200 which have received, from the management server 300, a migrate command for migrating a virtual machine and that becomes a migration destination to which a virtual machine is to be migrated starts the processing illustrated in FIG. 15. Examples of the migrate command, received from the management server 300, for migrating the virtual machine are the virtual-machine migrate commands 1090 and 1150 illustrated in FIG. 10.

The bandwidth-profile obtaining block 3000 executes processing 4010 for obtaining a bandwidth profile. In processing 4010, a bandwidth profile (for example, the bandwidth profile transmitted in processing 1100 or processing 1160 illustrated in FIG. 10) transmitted from the server that is included in the servers 100 and 200 which have received, from the management server 300, the migrate command for migrating the virtual machine and that becomes a migration source from which the virtual machine is to be migrated is received by the propagation-destination server and is stored in the memory 2100 therein. As a result, the migration-destination server obtains the bandwidth profile including information regarding the actual-measurement bandwidth in the migration-source server from which the virtual machine is to be migrated and the allocation situations of the physical resources in the migration-source server. One example of the bandwidth profile transmitted from server that is the migration source is the bandwidth profile illustrated in FIG. 6.

The reading block 3010 executes processing 4020 for reading the virtual machine profile. The virtual machine profile (for example, illustrated in FIG. 7) transmitted from the management server 300 in conjunction with the migrate command for migrating the virtual machine is stored in the memory 2100 in the local server and the reading block 3010 reads the virtual machine profile from the memory 2100. In processing 4010 and 4020, the sequence of the processing may be interchanged.

The calculating block 3020 executes processing 4030 for calculating the bandwidth on the basis of the virtual machine profile. On the basis of the allocation situation of the physical resources in the migration-source server, the allocation situation being indicated in the bandwidth profile obtained in processing 4010, and the allocation situation of the physical resources in the migration-destination server, the allocation situation being indicated in the virtual machine profile read in processing 4020, the calculating block 3020 calculates the actual-measurement bandwidth of the virtual server, the actually measured bandwidth being indicated in the bandwidth profile obtained in processing 4010. It is assumed that the obtained bandwidth profile is the example illustrated in FIG. 6 and the read virtual machine profile is the example illustrated in FIG. 7, by way of example. In this case, in the migration-destination server, the CPU speed to be allocated to the virtual machine is 3 GHz, and in the migration-source server, the CPU speed allocated to the virtual machine is 2 GHz. Thus, in accordance with the ratio "1.5" of the CPU speeds, the bandwidth "200 Mbps" actually measured in the migration-source server is corrected to 300 Mbps, which is 1.5 times the actually measured bandwidth. The bandwidth calculation performed by the calculating block 3020 is executed by utilizing the ratio of physical resources allocated to the virtual machine in the migration-source server versus the physical resources allocated to the virtual machine in the migration-destination server, multiplying the ratio by a coefficient reflecting the virtual-switch scheduling load that depends on the number of flows in the migration-destination server, or applying a restriction based on the virtual NIC speed allocated to the virtual machine in the migration-destination server or the upper-limit value of the bandwidth allocated based on the speed of the physical NIC in the migration-destination server. In light of the foregoing, for example, the bandwidth may also be determined in accordance with the following relational expression.

Bandwidth=(Actual-measurement bandwidth in Migration-source server)×((Physical resources (for example,CPU speed)allocated in Migration-destination server)/(Physical resources(for example,CPU speed)allocated in Migration-source server))×(Coefficient of 1 or smaller that depends on the number of flows in Migration-destination server)

The coefficient of 1 or smaller that depends on the number of flows in the migration-destination server refers to a coefficient that reflects that the processing load of the scheduler in the virtual switch increases as the number of flows in the migration-destination server increases and this processing restricts the bandwidth. For example, the coefficient of 1 or smaller is a coefficient whose a value decreases as the number of flows increases. The coefficient may be predetermined in a test environment.

From the above-noted relational expression, the determined corrected bandwidth has a smaller value than 300 Mbps determined from the ratio of the CPU speeds. The calculated value may be used when it is smaller than the allocated virtual NIC capability (the upper-limit value) and the bandwidth (the upper-limit value) to be allocated depending on the physical NIC capability in the migration-destination server. However, when the calculated bandwidth is larger than either of those upper-limit values, the upper limit value may be used instead as the calculated bandwidth. Without considering all of the terms in the above-noted relational expression, the bandwidth may also be calculated on the basis of a part of the terms or a particular combination of the terms.

As a result of calculating, in processing in 4030, the bandwidth based on the bandwidth actually measured in the migration-source server, the bandwidth of the virtual machine in the migration-destination server is predicted. As described above, virtual-machine migration is utilized, for example, to perform load balancing or maintenance of a server or to perform power management in which virtual machines are gathered in a specific server. During execution of such processing, even when the operation of the virtual machine in the migration-destination server is ensured, there are cases in which the bandwidth of the virtual machine after the migration varies from the bandwidth of the virtual machine before the migration, depending on the allocation situations of the physical resources before and after the migration. Accordingly, as a result of the calculation in processing 4030, it is possible to obtain the prediction value that is closer to the actually measured value of the bandwidth of the virtual machine in the migration-destination server. Thus, even in the period in which the actual measurement of the bandwidth of the virtual machine in the migration-destination server is executed, it is possible to execute processing 4060 (described below) by using the high-accuracy prediction value. When there is no substantial difference between the execution environment of the virtual machine before the migration and the execution environment of the virtual machine after the migration, processing 4060 (described below) may be executed using the bandwidth actually measured in the migration-source server, without execution processing 4030. Examples of processing 4030 are processing 1110 and processing 1170 described above with reference to FIG. 10.

The updating block 3030 executers processing 4040 for updating the bandwidth profile on the basis of the virtual machine profile and the corrected bandwidth. The bandwidth profile of the migrated virtual machine is updated with the allocation situation (the CPU speed, the NIC speed, and so on) of the physical resources, the allocation situation being indicated in the virtual machine profile read in processing 4020 and the bandwidth corrected in processing 4030. One example of the updated bandwidth profile is the bandwidth profile illustrated in FIG. 8. The identifier is changed to "E" in order to indicate that the bandwidth is a corrected bandwidth. The bandwidth profile updated in processing 4040 is stored in the memory 2100.

The determining block 3040 executes processing 4050 for determining control processing on the basis of the corrected bandwidth. The corrected bandwidth in this case is the bandwidth corrected in processing 4030. In processing 4050, for example, when the corrected bandwidth is larger than the value obtained by dividing the bandwidth of the external link by the number of flows provided by the virtual machine, the individual queue is allocated to the flow corresponding to the corrected bandwidth. On the other hand, when the corrected bandwidth is smaller than the value obtained by dividing the bandwidth of the external link by the number of flows provided by the virtual machine, the universal queue is allocated to the flow corresponding to the corrected bandwidth. In this case, the rate at which the scheduler selects the queue with respect to that allocation is that each individual queue is selected at a rate of at least once relative to the total number of flows and the universal queue is selected at the remaining rate.

Even in the period in which the actual measurement of the bandwidth of the virtual machine in the migration-destination server is waited for in processing 4050, control processing is determined using the corrected bandwidth as a prediction value. That is, even in the period in which the bandwidth of the virtual machine in the migration-destination server is actually measured is waited for, processing for ensuring the fairness in the transmission of each flow to the external link is executed to reduce the number of queues, thereby minimizing the processing load of the scheduler.

The executing block 3050 executes processing 4060 for executing the determined control processing. In processing 4060, the executing block 3050 executes the determined control processing (for example, queue management) in the server by setting the control processing, determined in processing 4050, for the sorter and the scheduler included in the virtual switch in the server. Examples of processing 4060 are processing 1120 and processing 1180 described above with reference to FIG. 10. When processing 4060 is completed, the processing in FIG. 15 ends.

FIG. 16 illustrates other processing executed by the queue controller (130, 230) in the server (100, 200) according to the embodiment. Examples of the processing illustrated in FIG. 16 are processing 1020, processing 1060, and processing 1130 described above with reference to FIG. 10. When multiple virtual machines are executed in the server, the processing illustrated in FIG. 16 may be simultaneously executed on the multiple virtual machines or may be asynchronously executed on the individual virtual machines.

The measurement controlling block 3060 executes processing 4510 for issuing a command for starting measurement of the amount of data. The measurement controlling block 3060 identifies a target whose amount of data is to be measured and executes a command for causing the monitor in the server to measure the amount of data transmitted by the identified target. For example, for identifying one virtual machine as a target whose amount of data is to be measured, the virtual machine that is a measurement target may be identified using the virtual-machine MAC address or IP address allocated by the management server 300. Also, for identifying one flow as a target whose amount of data is to be measured, the flow that is a measurement target may be identified using a combination of a source MAC address and a destination MAC address of the flow or a combination of a source IP address and a destination IP address. A measuring block 5100 (described below) in the monitor identifies the measurement target by determining whether or not a captured packet contains those pieces of identification information in the command issued from the measurement controlling block 3060 and measures the amount of data in a packet of the measurement target.

The timer 3070 executes processing 4520 for starting measurement of a measurement time of the amount of data. Processing 4520 may also be executed simultaneously with processing 4510.

The measurement controlling block 3060 executes processing 4530 for determining whether or not the value of the timer 3070 is a predetermined value. When it is determined that the value of the timer 3070 is not the predetermined value, the timer 3070 continuously performs the time measurement. When it is determined that the value of the timer 3070 is the predetermined value, the process proceeds to processing 4540.

The measurement controlling block 3060 executes processing 4540 for issuing a command for suspending the measurement of the amount of data. The measurement controlling block 3060 issues, to a monitor (described below), a command for suspending the measurement of the amount of data of the measurement target. The monitor receives the suspend command issued in processing 4540 and reports the measured amount of data to the queue controller.

The measurement controlling block 3060 executes processing 4550 for stopping the timer. In processing 4550, the measurement of the measurement time for calculating the bandwidth is suspended. Processing 4550 may also be executed simultaneously with processing 4540.

The amount-of-data obtaining block 3080 executes processing 4560 for obtaining the measured amount of data. The monitor receives the suspend command issued in processing 4540 and reports the measured amount of data to the queue controller. The amount-of-data obtaining block 3080 obtains the reported amount of data.

The computing block 3090 executes processing 4570 for computing the bandwidth on the basis of the measured amount of data and the value of the timer. In processing 4570, the bandwidth of the measurement target is computed by dividing the amount of data obtained in processing 4560 by the measurement time measured by the timer 3070.

The updating block 3030 executes processing 4580 for updating the bandwidth profile on the basis of the virtual machine profile and the actually measured bandwidth. The actually measured bandwidth in this case is the bandwidth computed in processing 4570. For example, when one example of the bandwidth profile updated in processing 4580 is the bandwidth profile illustrated in FIG. 9, the actually measured bandwidth is 295 Mbps and the identifier is changed to "M" in order to indicate that the bandwidth is an actually measured bandwidth. The bandwidth profile updated in processing 4580 is stored in the memory 2100.

The determining block 3040 executes processing 4590 for determining control processing on the basis of the actually measured bandwidth. In processing 4590, for example, when the actually measured bandwidth is larger than the value obtained by dividing the bandwidth of the external link by the number of flows provided by the virtual machine, the individual queue is allocated to the flow corresponding to the actually measured bandwidth. On the other hand, when the actually measured bandwidth is smaller than the value obtained by dividing the bandwidth of the external link by the number of flows provided by the virtual machine, the universal queue is allocated to the flow corresponding to the actually measured bandwidth. The rate at which the scheduler selects the queue with respect to that allocation is that each individual queue is selected at a rate of at least once relative to the total number of flows and the universal queue is selected at the remaining rate.

The executing block 3050 executes processing 4600 for determining control processing on the basis of the actually measured bandwidth. In processing 4600, the executing block 3050 executes the determined control processing (for example, the queue management) in the server by setting the control processing, determined in processing 4590, for the sorter and the scheduler included in the virtual switch in the server. Examples of processing 4600 are processing 1140 and processing 1190 described above with reference to FIG. 10. That is, in processing 4600, processing for ensuring the fairness in the transmission of each flow to the external link is executed to reduce the number of queues, thereby minimizing the processing load of the scheduler.

Processing 4610 is executed for determining whether or not the measurement of the amount of data is to be continued. When it is determined in processing 4610 that the measurement of the amount of data is to be continued, the process returns to processing 4510. When it is determined that the measurement of the amount of data is not to be continued, the processing illustrated in FIG. 16 ends.

Figure 17:
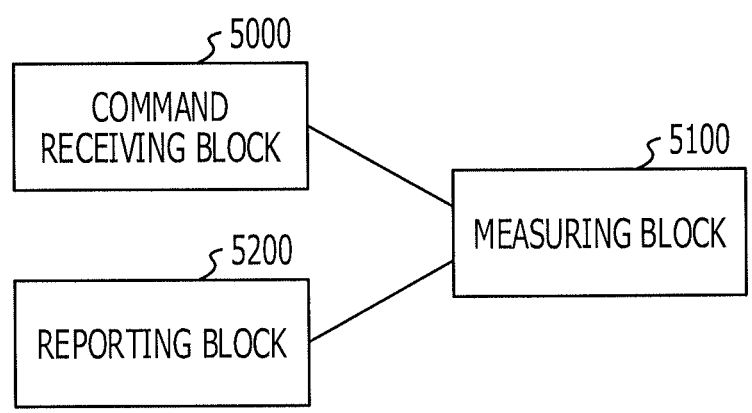
FIG. 17 illustrates functional blocks in a monitor in the server according to the embodiment.

FIG. 17 illustrates functional blocks in the monitor (123, 223) in the server (100, 200) according to the embodiment. The CPU 2000 executes the program stored in the memory 2100 to thereby cause the corresponding one of the monitors 123 and 223 to function as a command receiving block 5000, the above-described measuring block 5100, and a reporting block 5200. Processing executed by each functional block is described below in connection with the processing illustrated in FIG. 18.

Figure 18:
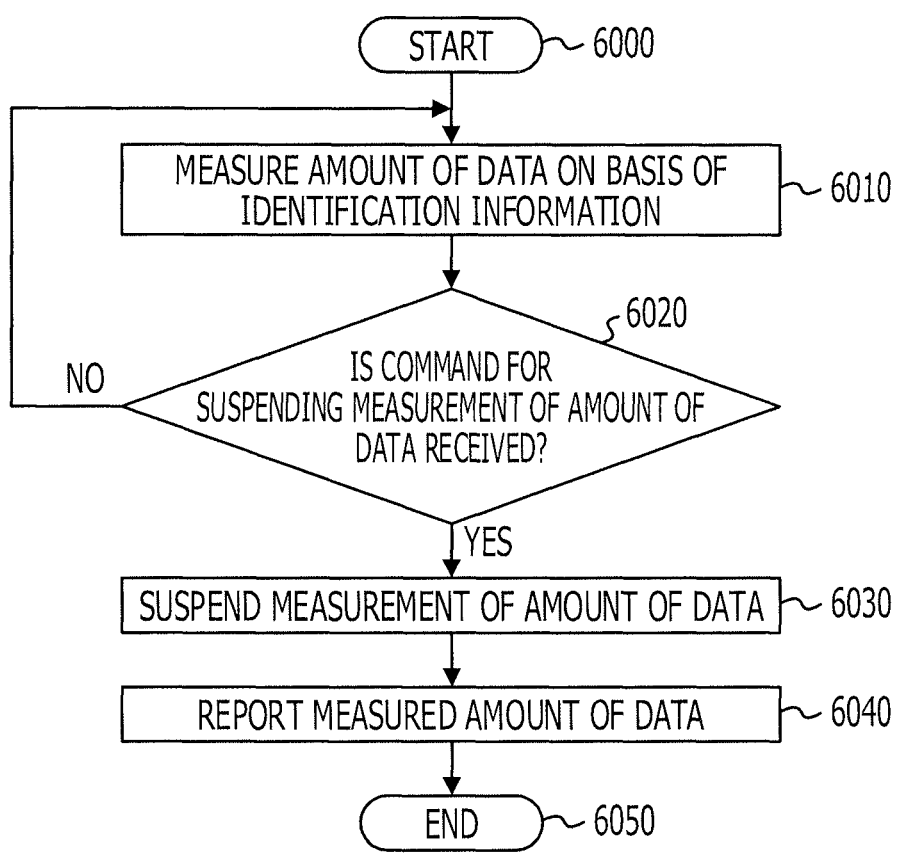
FIG. 18 illustrates processing executed by the monitor in the server according to the embodiment.

FIG. 18 illustrates processing executed by the monitor (123, 223) in the server (100, 200) according to the embodiment. Examples of the processing illustrated in FIG. 18 are processing 1010, processing 1040, processing 1050, and processing 1080 described above with reference to FIG. 10.

When the command receiving block 5000 receives a command for starting the measurement of the amount of data from the queue controller, the monitor (123, 223) starts the processing illustrated in FIG. 18.

The measuring block 5100 executes processing 6010 for measuring the amount of data on the basis of the identification information. The measuring block 5100 identifies a measurement target on the basis of the identification information included in the above-described command issued by the measurement controlling block 3060. For example, the measuring block 5100 compares the information contained in a captured packet with the identification information to determine whether or not the packet contains data of the measurement target. When the data identified by the measuring block 5100 is data of the measurement target, the amount of data of the measurement target is measured.

The command receiving block 5000 executes processing 6020 for determining whether or not a command for suspending the measurement of the amount of data is received. When it is determined that a command for suspending the measurement of the amount of data is not received, the process returns to processing 6010. When it is determined that a command for suspending the measurement of the amount of data is received, the process proceeds to processing 6030.

The measuring block 5100 executes processing 6030 for suspending the measurement of the amount of data, to thereby suspend the measurement of the amount of data.

The reporting block 5200 executes processing 6040 for reporting the measured amount of data. In processing 6040, the reporting block 5200 reports, to the queue controller, the amount of data measured by the measuring block 5100.

Figure 19:
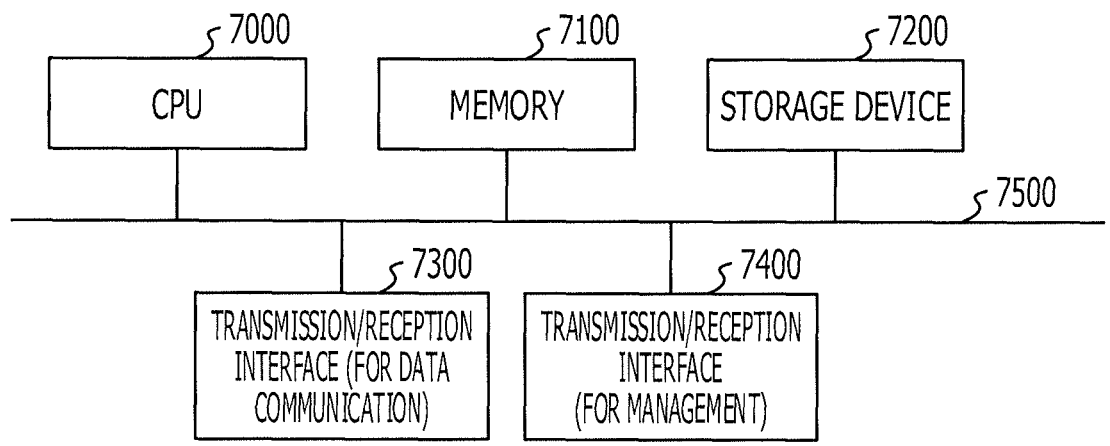
FIG. 19 illustrates the hardware configuration of a management server according to the embodiment.

FIG. 19 illustrates the hardware configuration of the management server (300) according to the embodiment. The management server 300 is a computer having a CPU 7000, a memory 7100, a storage device 7200, a transmission/reception interface (for data communication) 7300, a transmission/reception interface (for management) 7400, and a bus 7500 to which those elements are connected.

The CPU 7000 includes one or more processors for executing processing. The memory 7100 is, for example, a RAM. The storage device 7200 is, for example, a nonvolatile memory, such as a ROM or a flash memory, or a magnetic disk device, such as a HDD. The transmission/reception interface (for data communication) 7300 is an interface for transmitting/receiving data to/from an external apparatus and is, for example, an interface circuit, a communication circuit, a communication control circuit, or a circuit in a network interface card or the like. The transmission/reception interface (for management) 7400 is an interface for transmitting/receiving data for management and is, for example, an interface circuit, a communication circuit, a communication control circuit, or a circuit in a network interface card or the like.

A program stating processing for controlling the operation of the management server 300 is stored in the memory 7100. The CPU 7000 executes the program stored in the memory 7100 to thereby control the operation of the management server 300.

The management server 300 may also execute the functions of the above-described servers 100 and 200. For example, the arrangement may be such that, in response to a command for migrating the virtual machine, the management server 300 obtains the bandwidth profiles of the virtual machines executed in the servers 100 and 200 and the virtual machine profiles of the servers 100 and 200, corrects the bandwidths in the bandwidth profiles, and sets, for the servers 100 and 200, the queue management based on the corrected bandwidth.

According to the above-described embodiment, during migration of a virtual machine between servers, the post-migration bandwidth is calculated from the pre-migration bandwidth in accordance with a difference in allocated resources, so that the execution state in which the operation of the virtual machine and the operation of another virtual machine that shares the resources are cooperated with each other can be determined without waiting for actual measurement of the bandwidth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing method executed by a computer, comprising:
    calculating, for migration of a first virtual machine between a migration-source computer coupled to a network and a migration-destination computer coupled to the network, a difference between a first resource allocated to the first virtual machine in the migration-source computer and a second resource to be allocated to a second virtual machine corresponding to the first virtual machine in the migration-destination computer;
    estimating a bandwidth for the network to be used by the second virtual machine based on the difference and a bandwidth for the network used by the first virtual machine in the migration-source computer; and
    performing queue management for flows using the estimated bandwidth during a period of measuring an actual bandwidth of the migration-destination computer.

2. The information processing method according to claim 1, further comprising:
    determining a type of queues to be allocated to data transmission of the second virtual machine in the migration-destination computer, based on the estimated bandwidth,
    wherein the queues includes a first queue to which data transmission of the second virtual machine is to be allocated and a second queue to which data transmissions for a plurality of virtual machines are to be allocated.

3. The information processing method according to claim 2,
    wherein the first queue and the second queue are selected for data transmission so as to occur at a same rate.

4. The information processing method according to claim 2, wherein, the second virtual machine is operated by a first user and the plurality of virtual machines includes at least another virtual machine operated by another user.

5. The information processing method according to claim 1, wherein the difference is a difference between a first throughput of the first virtual machine which the first resource is allocated and a second throughput of the second virtual machine which the second resource is to be allocated.

6. The information processing method according to claim 1, further comprising:
correcting the calculated bandwidth based on a number of virtual machines executed in the migration-destination computer.

7. The information processing method according to claim 1, further comprising:
setting a processing speed of a virtual interface as the bandwidth estimated by the estimating, when the estimated bandwidth is larger than the processing speed of the virtual interface to be allocated to the second virtual machine in the migration-destination computer.

8. The information processing method according to claim 1, further comprising:
updating, after the bandwidth of the second virtual machine in the migration-destination computer is measured, the estimated bandwidth using the measured bandwidth.

9. The information processing method according to claim 1, further comprising:
scheduling data transmission of the second virtual machine by sharing resources allocated to the second virtual machine in the migration-destination computer.

10. The information processing method according to claim 1, further comprising:
allocating the second resource to the second virtual machine based on estimated bandwidth for use by the second virtual machine in the migration-destination computer.

11. The method of claim 1, wherein the estimating is executed by the processing device, and the processing device is a queue controller.

12. The method of claim 1, wherein the migration-source computer comprises a processor.

13. The method of claim 1, wherein the migration-destination computer comprises a processor.

14. The method of claim 1, wherein the network is a wide area network (WAN).

15. The method of claim 1, wherein the network is a local area network (LAN).

16. An information processing apparatus comprising:
a memory which stores a program; and
a processor, based on the program, configured to:
calculate, for migration of a first virtual machine between a migration-source computer coupled to a network and a migration-destination computer coupled to the network, a difference between a first resource allocated to the first virtual machine in the migration-source computer and a second resource to be allocated to a second virtual machine corresponding to the first virtual machine in the migration-destination computer;
estimate a bandwidth for the network to be used by the second virtual machine based on the difference and a bandwidth for the network used by the first virtual machine in the migration-source computer; and
perform queue management for flows using the estimated bandwidth during a period of measuring an actual bandwidth of the migration-destination computer.

17. A non-transitory computer-readable recording medium having stored therein a program for causing a computer to execute a process, the process comprising:
calculating, for migration of a first virtual machine between a migration-source computer coupled to a network and a migration-destination computer coupled to the network, a difference between a first resource allocated to the first virtual machine in the migration-source computer and a second resource to be allocated to a second virtual machine corresponding to the first virtual machine in the migration-destination computer;
estimating a bandwidth for the network to be used by the second virtual machine based on the difference and a bandwidth for the network used by the first virtual machine in the migration-source computer; and
performing queue management for flows using the estimated bandwidth during a period of measuring an actual bandwidth of the migration-destination computer.

18. A system for migrating a first virtual machine via a network, the system comprising:
a processor;
a migration-source server coupled to a network; and
a migration-destination server coupled to the network;
wherein
the processor is configured to:
calculate a difference between a first resource allocated to the first virtual machine in the migration-source server and a second resource to be allocated to a second virtual machine corresponding to the first virtual machine in the migration-destination server, for migration of -the first virtual machine between the migration-source server and the migration-destination server via the network;
estimate a bandwidth for the network to be used by the second virtual machine is based on the difference and a bandwidth for the network used by the first virtual machine in the migration-source server; and
perform queue management for flows using the estimated bandwidth during a period of measuring an actual bandwidth of the migration-destination computer.

* * * * *